United States Patent
Kilpack et al.

(10) Patent No.: US 11,852,364 B2
(45) Date of Patent: Dec. 26, 2023

(54) HVAC AIR BALANCE MONITORING AND TESTING SYSTEM

(71) Applicant: LIFE BALANCE TECHNOLOGIES LLC, Austin, TX (US)

(72) Inventors: Corey Kilpack, Petaluma, CA (US); Steven A. Manz, Sugar Land, TX (US); Eric Laflure, Tyler, TX (US)

(73) Assignee: LIFE BALANCE TECHNOLOGIES LLC, Austin, TX (US)

( * ) Notice: Subject to any disclaimer, the term of this patent is extended or adjusted under 35 U.S.C. 154(b) by 0 days.

(21) Appl. No.: 17/327,539

(22) Filed: May 21, 2021

(65) Prior Publication Data
US 2022/0299226 A1 Sep. 22, 2022

Related U.S. Application Data

(60) Provisional application No. 63/162,737, filed on Mar. 18, 2021.

(51) Int. Cl.
*F24F 11/64* (2018.01)
*F24F 11/38* (2018.01)
*F24F 11/52* (2018.01)
*F24F 110/40* (2018.01)

(52) U.S. Cl.
CPC .............. *F24F 11/38* (2018.01); *F24F 11/52* (2018.01); *F24F 11/64* (2018.01); *F24F 2110/40* (2018.01)

(58) Field of Classification Search
CPC ............ F24F 11/38; F24F 11/64; F24F 11/52; F24F 2110/40; F24F 11/30; F24F 8/10; F24F 11/0001
See application file for complete search history.

(56) References Cited

U.S. PATENT DOCUMENTS

| 4,751,501 A * | 6/1988 | Gut | F24F 13/28 340/607 |
| 2008/0179053 A1* | 7/2008 | Kates | F24F 11/65 165/208 |
| 2012/0058717 A1* | 3/2012 | Wiche | F24F 11/77 454/238 |
| 2012/0112883 A1* | 5/2012 | Wallace | G16H 50/80 340/10.1 |

(Continued)

OTHER PUBLICATIONS

Lynch, R.M. and Goring, R., 2020. Practical steps to improve air flow in long-term care resident rooms to reduce COVID-19 infection risk. Journal of the American Medical Directors Association, 21(7), pp. 893-894. (Year: 2020).*

*Primary Examiner* — Alicia M. Choi
(74) *Attorney, Agent, or Firm* — Reid E. Dammann; Gordon Rees Scully Mansukhani LLP

(57) ABSTRACT

The invention is an airborne infection control monitoring, condition data collection, testing and reporting system. The system includes new sensors and other equipment needed to collect HVAC data, the placement of the sensors in the HVAC system, software needed to retrieve the data, and the algorithms used in analyzing the data to the required building design specifications. The proposed method and system would collect current room condition data and apply it to a virtual ventilation, room and equipment structure to efficiently determine if the building's rooms meet the air balance and infection control requirements.

17 Claims, 18 Drawing Sheets

(56) References Cited

U.S. PATENT DOCUMENTS

| | | | |
|---|---|---|---|
| 2014/0222241 A1* | 8/2014 | Ols | F24F 11/70 |
| | | | 700/299 |
| 2014/0248833 A1* | 9/2014 | Royle | F24F 11/0001 |
| | | | 454/342 |
| 2016/0061477 A1* | 3/2016 | Schultz | G06F 13/4221 |
| | | | 700/276 |
| 2016/0131381 A1* | 5/2016 | Schmidlin | F24F 11/80 |
| | | | 700/277 |
| 2018/0031262 A1* | 2/2018 | Atchison | F24F 11/65 |
| 2018/0202674 A1* | 7/2018 | Lin | G05B 19/042 |
| 2018/0217621 A1* | 8/2018 | Biesterveld | G05D 23/1917 |
| 2019/0234631 A1* | 8/2019 | Wallace | B01L 1/04 |
| 2021/0080139 A1* | 3/2021 | Brown | G05B 13/048 |
| 2021/0285348 A1* | 9/2021 | Jentz | B60K 6/28 |
| 2022/0104983 A1* | 4/2022 | Kang | A61L 9/14 |
| 2022/0136857 A1* | 5/2022 | Pompili | G16H 40/67 |
| | | | 701/409 |
| 2022/0299226 A1* | 9/2022 | Kilpack | F24F 11/52 |
| 2022/0399105 A1* | 12/2022 | Wagner Block | G16H 40/20 |

* cited by examiner

HVAC AIR BALANCE MONITORING AND TESTING SYSTEM

CROSS-REFERENCE TO RELATED APPLICATION

The present application claims priority to U.S. Provisional Patent Application Ser. No. 63/162,737, of same title, filed Mar. 18, 2021, the entire disclosure of which is incorporated herein by reference in its entirety for all purposes.

BACKGROUND OF THE INVENTION

1) Field of the Invention

The present invention applies to air balancing and infection control in healthcare facilities and commercial buildings, including hospitals, assisted living facilities, office buildings, schools, restaurants, retail facilities and entertainment venues.

2) Discussion of the Related Art

Conventional air balance testing for infection control is achieved by means of manual data collection using handheld manometers and barometers. Within hospitals, this method and process is disruptive to medical personnel, facility managers and patients. In many cases, the potential for disruption will prevent the testing of infection control conditions. In the prior art, infection control calculations were performed with the limitations of spreadsheets or by calculating data from hand-written notes. Technicians use notebooks and calculators on smartphones or tablets to calculate the conditions of a room or facility. This inefficiency of data collection, data management and record keeping causes delays in balancing. It goes without saying, that manual reporting is susceptible to human error.

Infection control reports, including reports of healthcare facilities are incomplete. Currently, most hospitals test and report the infection control conditions of a small portion of their facility. Annual reporting is limited to what the hospital or accrediting agency deems as "critical care". In fact, most public and commercial buildings are tested for air balancing and infection controls only at the time of commissioning. Comprehensive commissioning balances are only done for new construction or permitted improvements. Once commissioned, infection control monitoring and reporting stops for most non-healthcare facilities.

Airflow in the heating, ventilation and air condition ("HVAC") systems is often reduced to conserve energy without consideration of the impact on air balance and air change requirements needed to prevent airborne infections. With the implementation of energy savings models in building management systems, failing infection control conditions exist in occupied spaces. Without a method for auditing the air balances and conditions, effects of conservation and the realized reduction of air change and differential pressures is unknown for most buildings.

SUMMARY OF THE INVENTION

In an embodiment, the invention includes a Data Integration Module ("DIM"). The DIM combines building specifications, HVAC equipment specifications, design condition measurements and regulatory standards into a database(s) for use in air balance design, air balance testing, and airborne infection control testing and reporting. Design conditions measurements are airflow measurements outlined in the as built mechanical drawings of a building, representing the expected airflow and balance conditions. A process to integrate building specifications with infection control standards begins by entering data from available life safety and mechanical drawings. The DIM provides the ability for a user to create a virtual representation of a building and rooms within it. A virtual representation can be built with the creation of a digital polygon structure outlining a digital image of every room. A digital polygon structure is a set of coordinates that relate to the location of a room or corridor on an image of available life safety, mechanical drawings or two-dimensional schematic of a building or room. The assigned coordinates are stored within a database, or varied databases, as part of the data set for the room or corridor. The relationship of the room to every adjacent room or corridor is part of a data set that the DIM uses to report and audit infection control conditions.

Data received into the DIM from the room specifications within the building mechanical drawings, includes the dimensions, square feet, cubic feet, room designation, and original design condition measurements and original design standards. The building specifications further includes the location of doors and pass-through windows (also referred to as envelope crossings), balance and pressure requirements of adjacent rooms, zone designations, floor designations and locations of connected HVAC equipment listed prior.

The DIM applies unique naming conventions to every room, register, envelope crossing and all HVAC equipment, but provides the ability for a user to accommodate the existing conventions for a particular building. The room use, or designation, is digitally matched to the corresponding standards data for required air balance. The relationship of the room to every adjacent room or corridor is part of the data set that the invention will use to report, analyze and predict infection control conditions.

Room specifications are separate from the associated digital polygon structure, so schematics, for reporting purposes, can be filtered for different views and applications. Schematic filters include, but are not limited to, registers, ducts, dampers, thermostats, sensors and directional pressure requirements.

Design condition measurements for registers and envelope crossings, utilized for air balance testing, are derived from the imported mechanical drawings and schedules. The design of the HVAC system and rooms are stored within a database, or varied databases. Design standards are airflow and differential pressure requirements applied in mechanical drawings and schedules. Current condition measurements are retrieved digitally from the database outlined in other embodiments of the invention. Current condition measurements include airflow, static pressure and differential pressure values retrieved from sensors within the building. Current condition measurements also include airflow, static pressure and differential pressure retrieved by calibrated handheld instruments.

HVAC equipment and building specifications are incorporated in one or more databases for continued use consistent with the invention. In an embodiment, invention integrates the HVAC equipment specifications and locations of the air handlers units, fans, variable frequency drives, duct systems, terminal units, and registers. The DIM will compare the air handler fan capabilities, including the fan speed, to the distribution of the air throughout the HVAC duct system. The DIM overlays the HVAC equipment locations with the digital polygon structure and stores the image within a database(s).

The DIM incorporates regulatory standards for air balance and infection control. Regulatory standards for air balance and infection control can include national standards such as those published by the American Society of HealthCare Engineering, as well as state mechanical codes and supplemental industry or regional standards. In an embodiment of the invention, regulatory standards are uploaded in comma separated value ("CSV") form. Regulatory standards are applied uniquely based on the room designations of a building. In an embodiment of the invention, each room has a unique standard while various standards may be applied to a building based on the date of construction, permitting or commissioning of the unique rooms. Infection control parameter-test requirements within regulatory standards include, but are not limited to; Air Changes per Hour ("ACH"), Minimum Outside Air Changes per Hour ("OACH"), Directional Pressure, Balance, Temperature, Humidity and Balance Differential. Room designation from building specifications are matched to corresponding regulatory standards for infection control parameter-test requirements. In an embodiment, the invention calculates the infection control parameter-test requirements from the building specifications combined within the regulatory standards, that can be used by stationary engineers and building managers, including minimum cubic feet per minute ("CFM"), which is derived from the room dimensions and applied regulatory standard.

In an embodiment, the invention produces various of air balance and infection control reports, including Commissioning reports, Air Balance Reports, Infection Control Reports, and Technician Worksheets. The embodiment incorporates technician certifications and calibration certificates of testing HVAC equipment for insertion into reports. Features within the invention will confirm that the certifications of technicians and calibration of testing equipment are within compliance.

In addition to the described reports, the embodiment has the capability to generate an automated report, including; summary tables of all of the rooms, detailed results of each individual room, and schematic depictions of the results. A report can be customized for selected filters, including, but not limited to: zones, buildings, projects, fan type, floor, public access, infection control, HVAC equipment, room application, critical care, pass/fail results, and specific parameters. Report generation may be utilized for periodic compliance filings, repair suggestions based on failures, audits, inspections and document review by accreditation and permitting agencies. Reports may be generated in PDF form which can be printed by users.

In addition, in this embodiment, the report generation feature my display infection control parameter-tests based on revised building design or newer standards. This aspect of the reporting future can be utilized for predictive modeling for new construction, repairs and improvements. Predictive modeling, in respect to this embodiment of the invention, is the ability to input theoretical airflow and differential pressure condition measurements within the virtually mapped buildings and analyze the results displayed in the generated reports.

In another embodiment, the invention includes a Condition Monitoring Module ("CMM"). The CMM collects and transmits differential pressure readings and CFM readings within ventilation systems and room envelope crossings for use in infection control parameter-testing.

The CMM connects to differential pressure sensors at the terminal units and at the envelope crossings within rooms with negative or positive pressure balance requirements outlined in the regulatory standards. Connection can be achieved through wired connections, or the transmission of Bluetooth or Wi-Fi signals to localized revisers throughout the building, which connects to a database, or varied databases. Transmitting the current conditions measurements to a database allows for expedient access, extensive data storage, record keeping, analysis capabilities and usage by the DIM for infection control parameter-testing. The data transmission interval from the sensors can be based on building automation system data transmission intervals that align with established condition monitoring for energy efficiency, smoke, fire, temperature control and any relevant comfort or safety features.

In another embodiment, the invention includes an Integrated Monitoring Module ("IMM"). Most commercial buildings utilize Building Automation Systems ("BAS"), which are used to monitor life safety measurements (e.g., fire alarms, smoke detection, etc.) and also to regulate the temperature, humidity and airflow throughout the building. Most BAS have incorporated energy efficiency algorithms, which reduces or increases the airflow to maintain a standard temperature at optimal energy consumption. The IMM integrates calculations that consider current conditions measurements, HVAC equipment specifications, HVAC equipment performance and regulatory standards.

The IMM with an accompanying BAS will reveal infection control and air balance conditions that are not available on any existing BAS. The IMM reveals the current condition measurements at the room level where existing systems merely reveal the mechanical specifications. The current condition measurements are retrieved from occupied and working environments, where in the prior art, retrieving current condition measurements required areas to be unoccupied for testing.

The IMM provides infection control parameter-testing and report generation on-demand for an integrated BAS, allowing tracking of infection control conditions, rather than just the fan or terminal unit conditions. If a room fails its specific air balance, air change or differential pressure requirement, a suggestion of how to remedy this condition, along with failed room information is displayed within the BAS. Air Balance and infection control failure notifications are then sent to the building's engineers or other designated personnel. General information contained in the notifications may consist of the location, time and type of failure that occurred within the building. In an embodiment of the IMM, the notification contains information concerning how to remedy the failing condition. An example of this is the display of excess supply or exhaust CFM and excess air change per hour within a room connected to the same terminal unit. The information in the notification will allow the troubleshooting and adjustment process to occur much more efficiently. Following the digital notification, the BAS would adjust the VAV terminal units to optimize the airflow needed to meet the required standards. Integration with a BAS in this embodiment also allows the BAS set points to be automatically updated within a database, or varied databases, enabling more efficient responses to changing current conditions measurements within the building, creating a safer working environment for every occupant.

The embodiments of the invention, increase the efficiency of the airborne infection control process including data collection, record keeping, testing and reporting. Once implemented, a process that currently takes days to weeks will be instantaneous or reduced to minutes and hours.

DETAILED DESCRIPTION OF THE INVENTION

Figure 1:
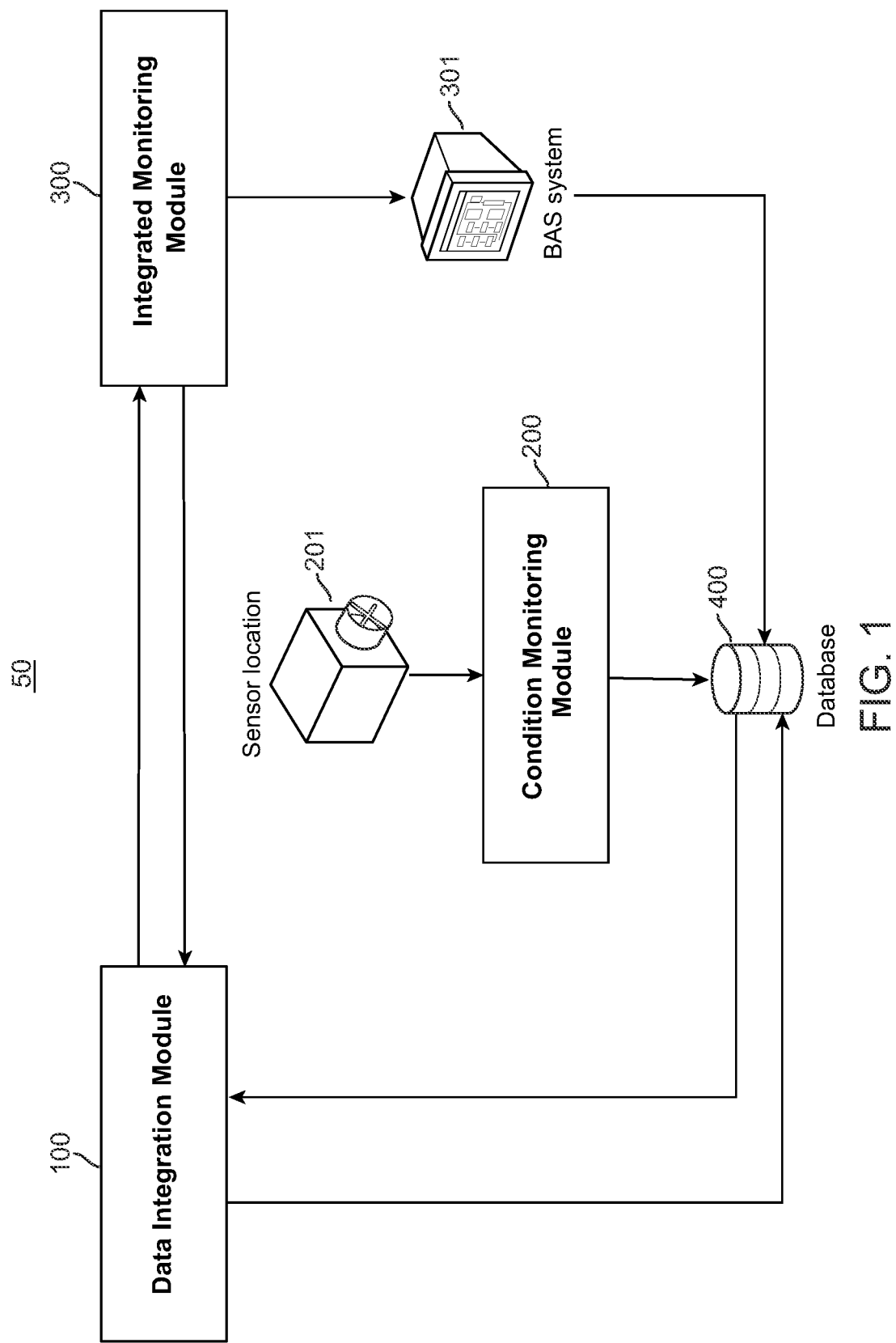
FIG. 1 illustrates an overview of a system for controlling airborne infection, which includes the Data Integration Module, Condition Monitoring Module and Integrated Monitoring Module.

The detailed description set forth below in connection with the appended drawings is intended as a description of presently preferred methods of the invention and is not intended to represent the only forms in which the present invention may be constructed and/or utilized. The invention discussed below may be implemented by a combination of hardware, software, and/or firmware, in various applications which may include a computer. The computer may be configured by a computer readable medium or program code to provide functionality. The program instructions may be those designed for the purposes of the present invention. When executed on the computer system of a user, configures that computer system so that the user can receive and provide information. It should be appreciated that any one or more elements of the system for controlling airborne infection in an at least one environment illustrated in the following embodiments can be located remotely from any or all of the other elements, and that any of the elements of a given embodiment can, in fact, be part of another system altogether.

An embodiment of the invention includes at least three modules that work in correlation: a Data Integration Module 100 which at least includes the functionality of integrating building specifications, HVAC equipment and associated data, current condition measurements and regulatory standards; a Condition Monitoring Module 200 for at least collecting and transmitting pressure and volume readings within ventilation systems and room envelope crossings; and, an Integrated Monitoring Module 300 for airborne infection control monitoring, condition data collection and testing integration with building automation systems.

In an embodiment, the respective modules described above are designed to improve the efficacy of the airborne infection control process and include a computer software application which, when executed on the computer system of a user, configures that computer system so that the user can receive and provide information and data to users or groups of users based on the designated input. In particular, in these embodiments, the invention is a software and data management solution for monitoring, testing and reporting air balance and infection control conditions. It calculates the quantity of airflow required to meet the established regulatory standards designed to minimize airborne infections and may generate digital reports or notifications summarizing the building's air balance design, monitored conditions and test results.

The above modules may be integrated with a variety of systems, including commercial building automation systems, that provide monitoring and data collection services for the life safety and energy optimization in commercial buildings such as hospitals, assisted living facilities, office buildings, retail facilities, schools, and entertainment venues. An embodiment of this is outlined in the Integrated Monitoring Module 300. The referenced figures describe the invention's modules and the systems for monitoring and testing air balance and infection control conditions along with the equations necessary to confirm the quantity of airflow and pressure differential required to meet the established national and state airborne infection and ventilation standards.

FIG. 1 of the accompanying drawings illustrates an overview of a system for controlling airborne infection 50, which in an embodiment, includes a Data Integration Module 100, a Condition Monitoring Module 200 and an Integrated Monitoring Module 300.

In an embodiment, the Data Integration Module ("DIM") 100 receives and combines building specifications, HVAC equipment specifications, design measurements and regulatory standards into a specifically structured database 400, or varied databases, for use in airborne infection control testing and reporting. Building specifications, HVAC equipment and regulatory standard input and selection process of the DIM 100, are received in an embodiment of the invention. In an embodiment of the invention, the DIM 100 performs infection control parameter-tests based on current or design measurements and regulatory standards stored within a database 400, or varied databases, and generates an air balance report from this received information.

In an embodiment, the Condition Monitoring Module ("CMM") 200 collects and transmits differential pressure readings within ventilation systems and room envelope crossings for use in airborne infection control. The CMM 200 connects to differential pressure sensors that may be located within terminal units, and at the envelope crossings within rooms that may contain negative or positive balance requirements. This connection is achieved through wired connections, or the transmission of Bluetooth or Wi-Fi signals to localized revisers throughout the building illustrated in 201. The current condition measurements are transmitted to the CMM 200 to a specifically structured database 400, or varied databases, for storage and accessibility by the other modules of the invention.

In an embodiment, the Integrated Monitoring Module ("IMM") 300 integrates calculations that consider the current conditions listed prior, equipment specifications, equipment performance and the selected regulatory standard from the DIM 100. The IMM 300 with an accompanying BAS 301 integrates the monitoring of conditions in air changes and differential pressures in occupied and working conditions from the Condition Monitoring Module 200 and the infection control reporting and analysis from the DIM 100. This consistent connection with all the modules is established through the database(s) 400, enabling more efficient responses to changing conditions within the building.

Figure 2A:
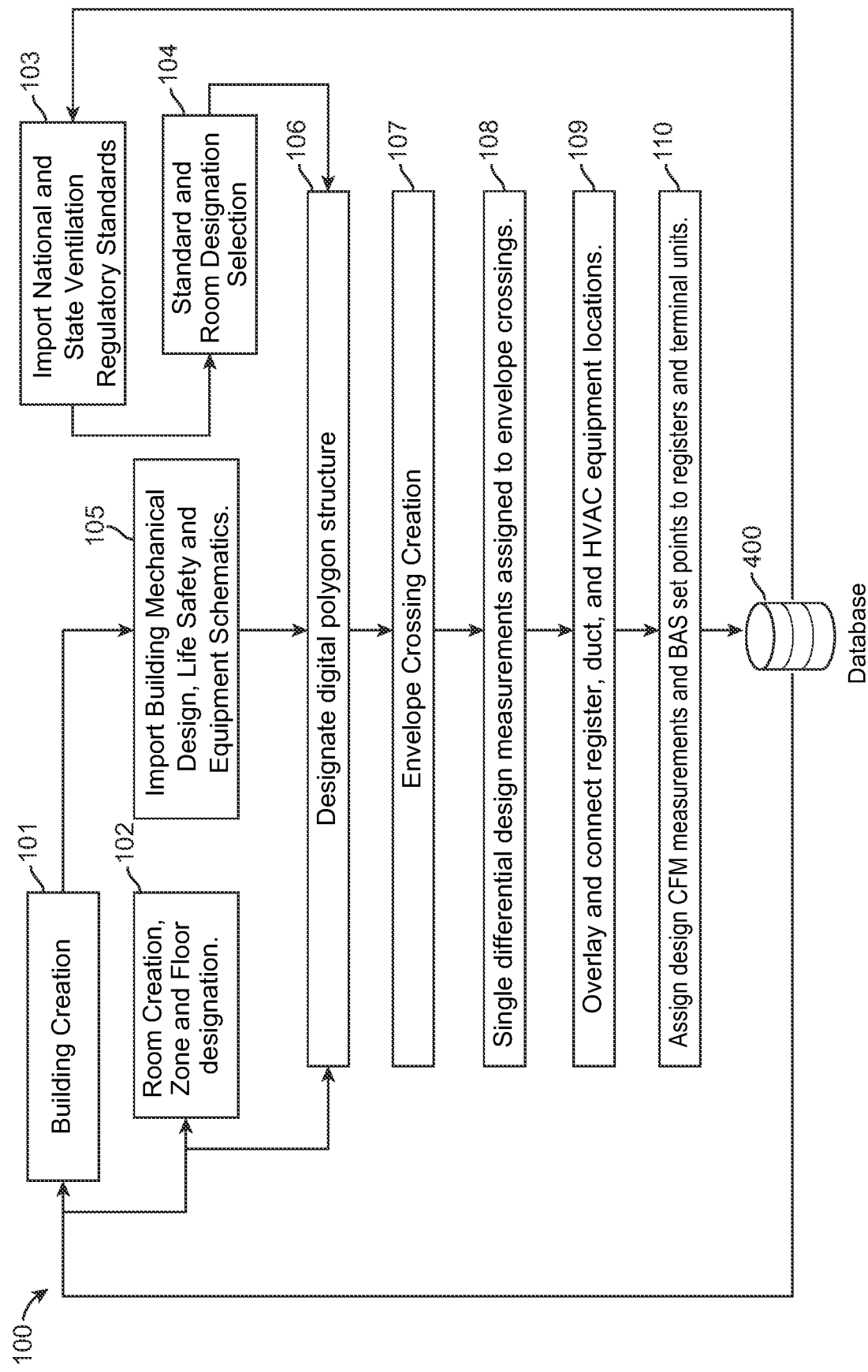
FIG. 2a illustrates an embodiment of the Data Integration Module.
Figure 2B:
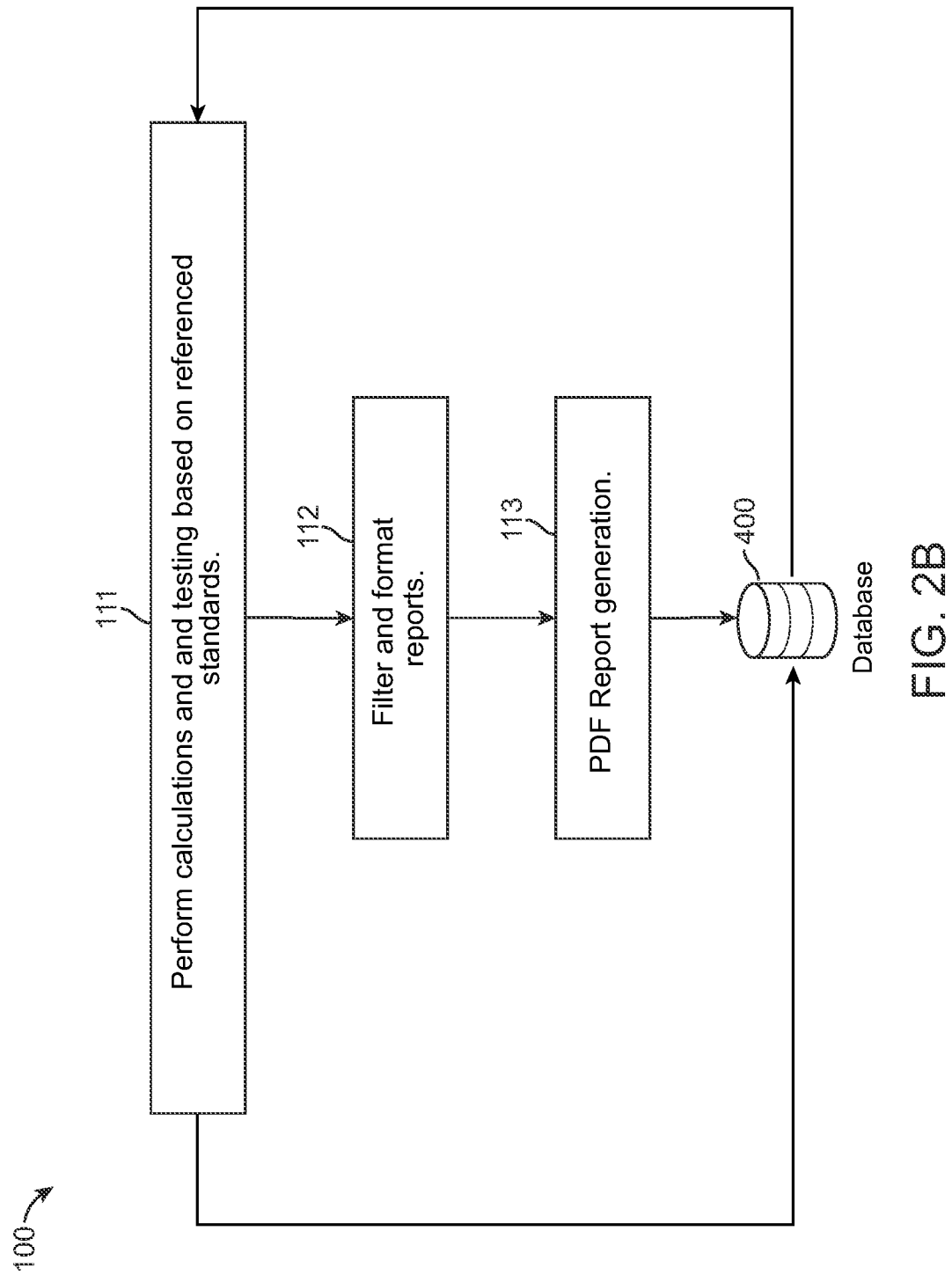
FIG. 2b illustrates an embodiment of the Data Integration Module.

FIGS. 2a and 2b of the accompanying drawings illustrate an embodiment of the DIM 100. The DIM 100 involves inputting and selecting building specifications, HVAC equipment specifications and regulatory standards. The module encompasses the formation of a data structure foundation that the computer software application utilizes to perform infection control parameter-testing and reporting.

The DIM 100 begins with the initial building name and general specification inputs 101. Once the newly created building is selected, room information and dimensions within that building are inputted 102. When the square footage and height do not properly calculate the total room volume, adjustments may be added to the room to account for room shape abnormalities. After this process, rooms are assigned to specified zones and floors for report filtering.

National standards such as those published by the American Society of HealthCare Engineering as well as state and industry specific ventilation standards 103, in an embodiment of the invention, may be uploaded into the software in comma separated value ("CSV") form. The regulatory standards 103 are specifically applied to each room of the building and room designations are selected 104 based on these standards.

Figure 3:
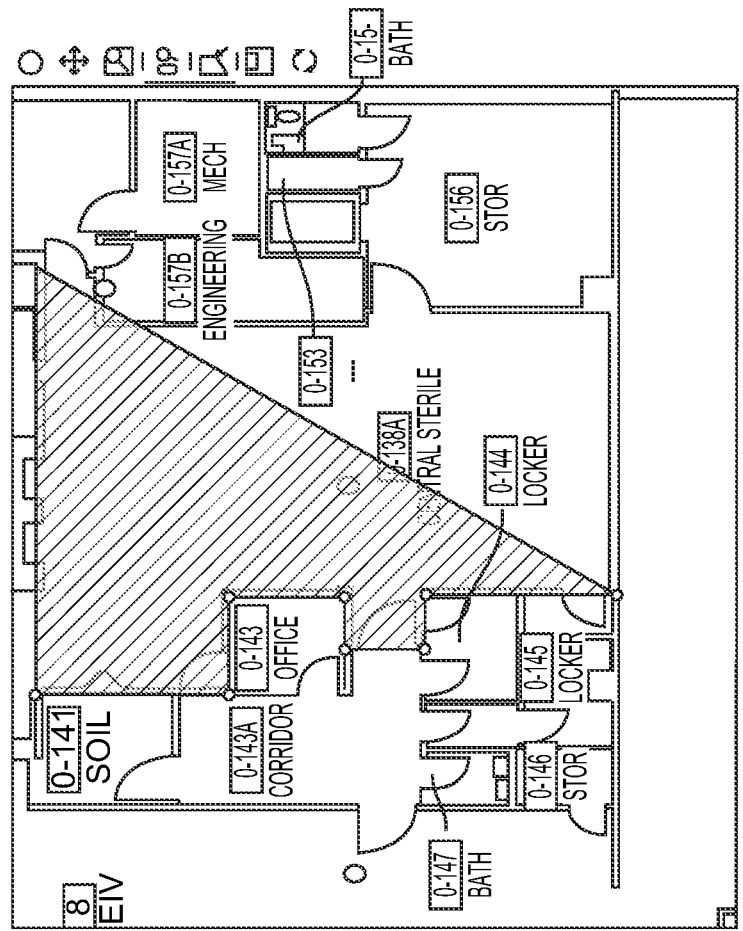
FIG. 3 illustrates an embodiment of a virtual polygon structure creation within an embodiment of the Data Integration Module.

The next aspect of the embodiment integrates the building's mechanical, life safety and HVAC equipment specifications 105. These images may be incorporated into a database(s) 400 in any digital form, including, but not limited to, PNG and PDF. From these images and information, each room is assigned a virtual room location. This location is designated by a digital polygon structure 106. A digital polygon structure is a set of coordinates that relate to the location of a room or corridor on an image of available life safety, mechanical drawings or two-dimensional schematic of a building or room, capturing the image of the room so equipment displays can be overlaid. FIG. 3 of the accompanying drawings illustrates virtual polygon structure creation within an embodiment of the DIM.

Once the digital polygon structure coordinates are designated, envelope crossing locations 107 are designated establishing connections between two digital polygon structures, to represent the doors and windows within the building. The envelope crossings can be assigned as primary to designate primary airflow between rooms and to designate mandatory cascade requirements. The embodiment is capable of indicating conflicts where two positive rooms share an envelope crossing and may require a cascade. The embodiment detects, using the database and algorithms, where conflicts can be resolved by removing the positive or negative pressure requirement, or where the envelope crossing has a mandatory cascade. Single differential design measurements 108 are assigned to each envelope crossing specifying the differential pressure between the two virtual rooms for design condition reporting. The design pressure measurement can be manually entered, or retrieved from a database 400, or varied databases, using algorithms in the IMM.

Figure 15:
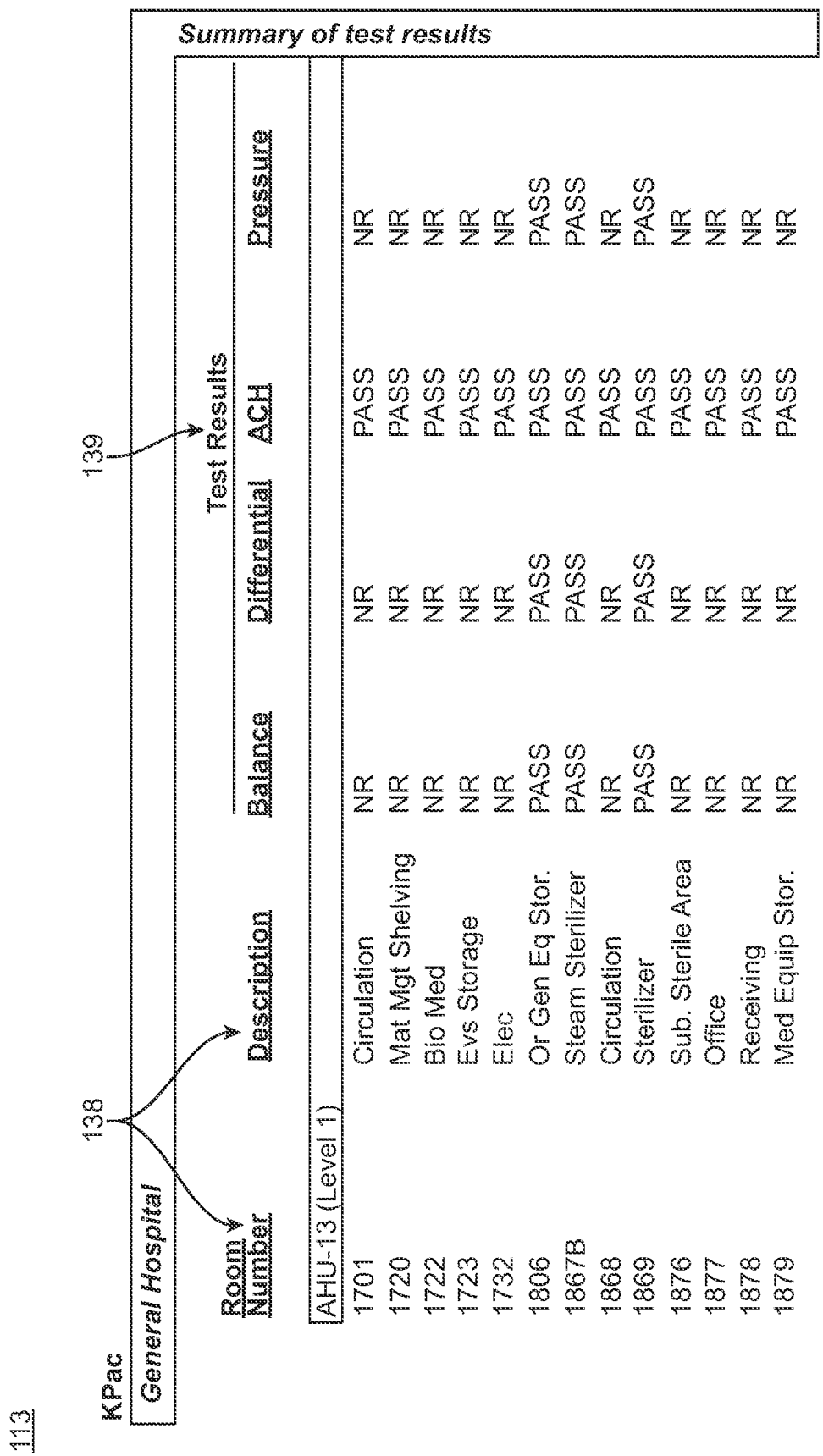
FIG. 15 illustrates a result summary within an example of an Air Balance Report generated within an embodiment of the Data Integration Module.
Figure 16:
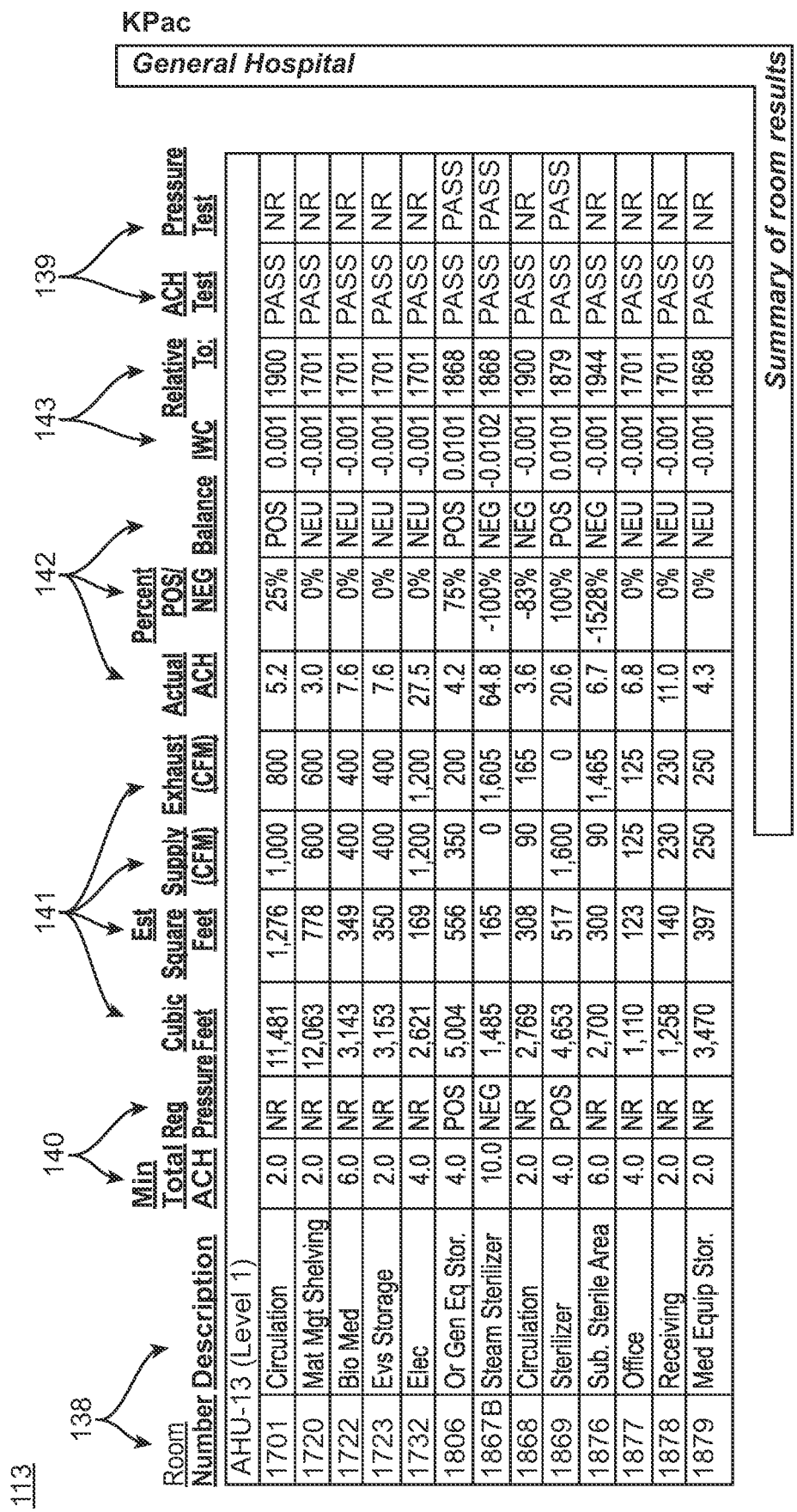
FIG. 16 illustrates a summary table within an example of an Air Balance Report generated within an embodiment of the Data Integration Module.
Figure 17:
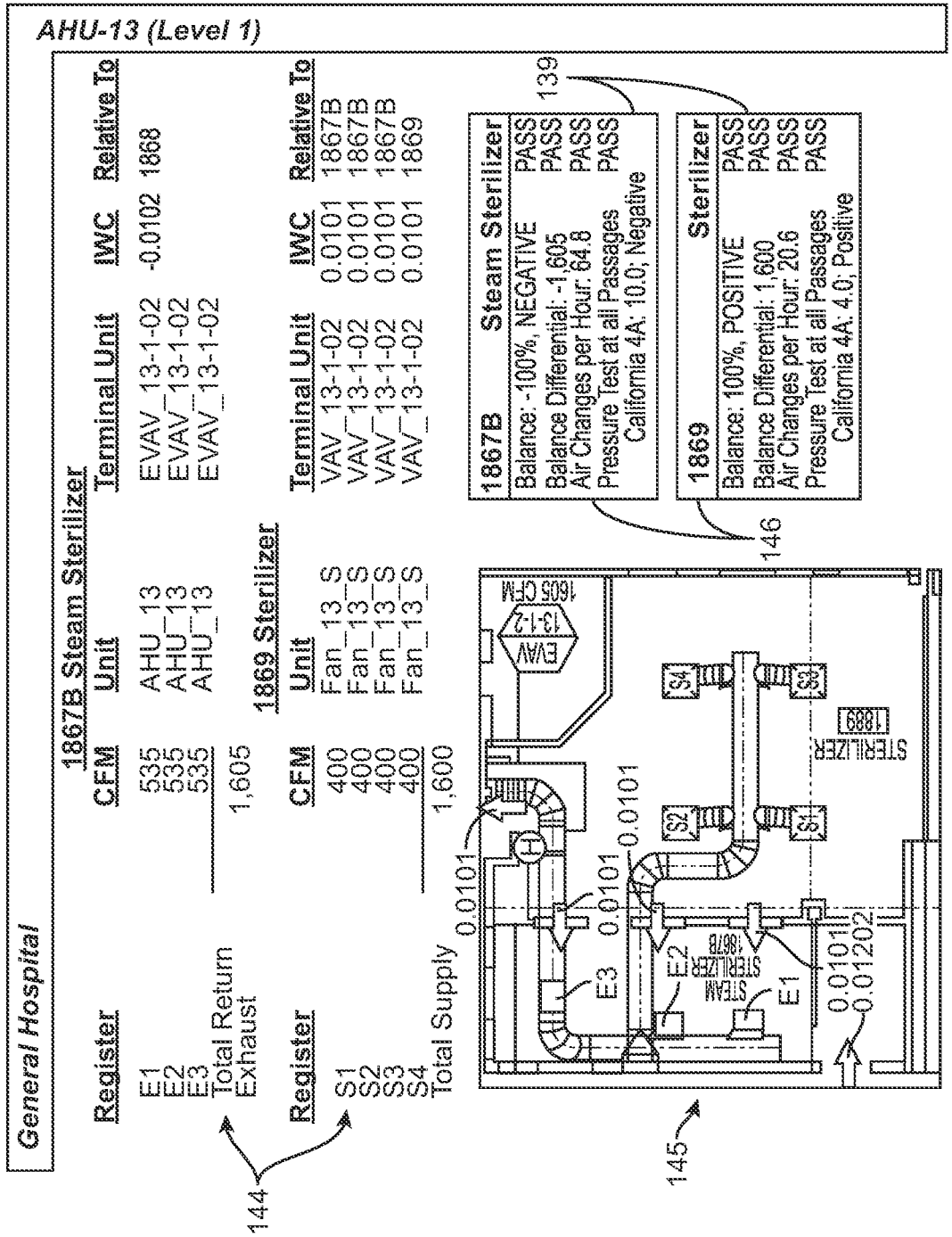
FIG. 17 illustrates a room group result within an example of an Air Balance Report generated within an embodiment of the Data Integration Module.

The mechanical drawing and equipment specifications 105 are utilized for overlaying register, duct, and HVAC equipment locations 109 within the designated digital polygon structures. Once overlaid, the registers and ducts are connected, in a relational database 400, or varied databases, to the terminal units and air handler unit fans associated with them. This relationship is established so it can be displayed in the air balance report. Design CFM measurements and BAS set points 110 are assigned to registers and terminal units for design measurement reporting. This data structure is saved by connecting with a specifically structured database 400, or varied databases, to store and transmit data through this module. The data structure established in a database(s) 400 can be referenced to perform necessary calculations and testing 111 based on referenced regulatory standards 103. Air balance tests required by national and state regulatory standards include a pressure balance test, differential pressure test, air change per hour test, minimum outside air changes test, minimum differential test, maximum occupancy test and minimum airflow test. Once the tests are performed, the results are stored in database(s) 400. This allows access to the data for report generation. Air balance reports containing up to date measurements may be generated with specific room filtering and order to meet client's desired report formatting requests 112. Examples of the contents of a generated air balance report are illustrated in FIG. 15-17 of the accompanying drawings. Supportive documents such as technician certifications and calibration certificates 113 may be attached to the generated report within the software application. Once the formatting is complete and documents are attached, the updated air balance report may be downloaded within the software application and stored within the database(s) 400 for record keeping and later access.

Figure 4:
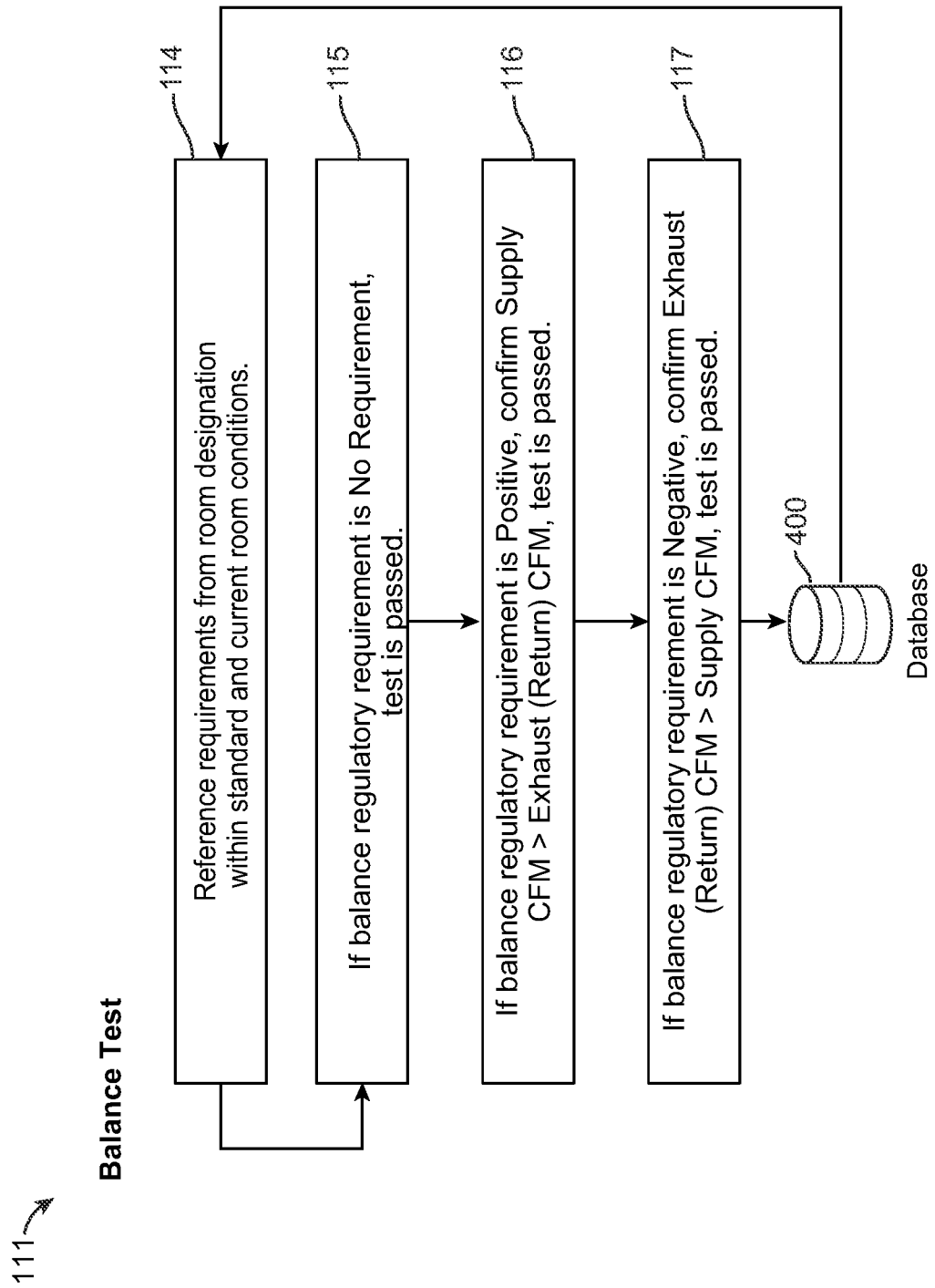
FIG. 4 illustrates balance test equations within an embodiment of the Data Integration Module.

FIG. 4 of the accompanying drawings illustrates balance test equations within an embodiment of the DIM 100. The balance test calculations require the referencing of pressure balance requirements within the regulatory standard 103 based on the applied room designation 114 within a database(s) 400. With the referenced regulatory variables 114 and the measurements collected either manually, from the installed sensors in 202 or transmission from BAS 301, the following "if" statements are processed to determine if the individual rooms pass the differential pressure balance requirements associated with the selected room designation.

If the pressure balance regulatory requirement is No Requirement, the test is passed 115. If the pressure balance regulatory requirement is Positive, the result of the Supply CFM divided by the Return CFM must be greater than zero, the room passes 116. If the pressure balance regulatory requirement is Negative, the result of the Return/Exhaust CFM divided by the Supply CFM must be greater than zero, the room passes 117. The test results are stored in a structured database, or varied databases 400, for referencing for air balance report generation.

Figure 5:
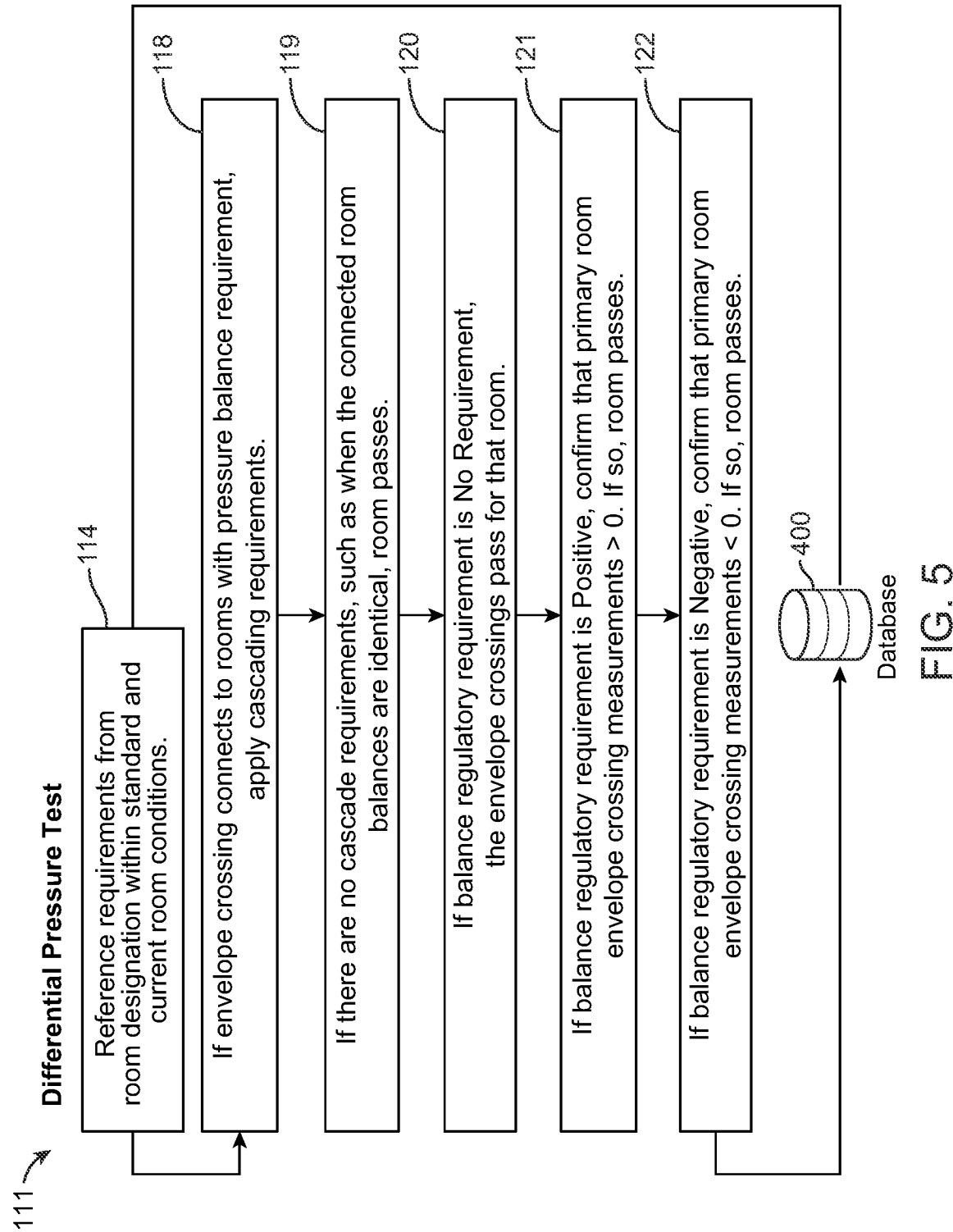
FIG. 5 illustrates differential pressure test equations within an embodiment of the Data Integration Module.

FIG. 5 of the accompanying drawings illustrates differential pressure test equations within an embodiment of the DIM 100. The differential pressure test calculations require the referencing of pressure balance requirements within the regulatory standard 103 based on the applied room designation 114 within a database(s) 400. With the referenced regulatory variables 114 and the measurements collected either manually, from the installed sensors 202 or transmission from BAS, the following "if" statements are processed to determine if the individual rooms pass the differential pressure balance requirements associated with the selected room designation.

If envelope crossing connects to rooms with pressure balance requirements, apply cascading requirements 118. If the envelope crossing connects to rooms with the same pressure balance requirement, the envelope crossing passes 119. If the room's pressure balance regulatory requirement is "No Requirement," the envelope crossings connected to that room pass for that room 120. If the room's pressure balance regulatory requirement is Positive, confirm that the envelope crossing measurements related to it as a primary room is greater than the required differential pressure, the room passes 121. If the balance regulatory requirement is Negative, confirm that the envelope crossing measurements related to it as a primary room exceeds the required pressure, the room passes 122. The test results are transmitted to a structured database, or varied databases 400, for storage and referencing for air balance report generation.

Figure 6:
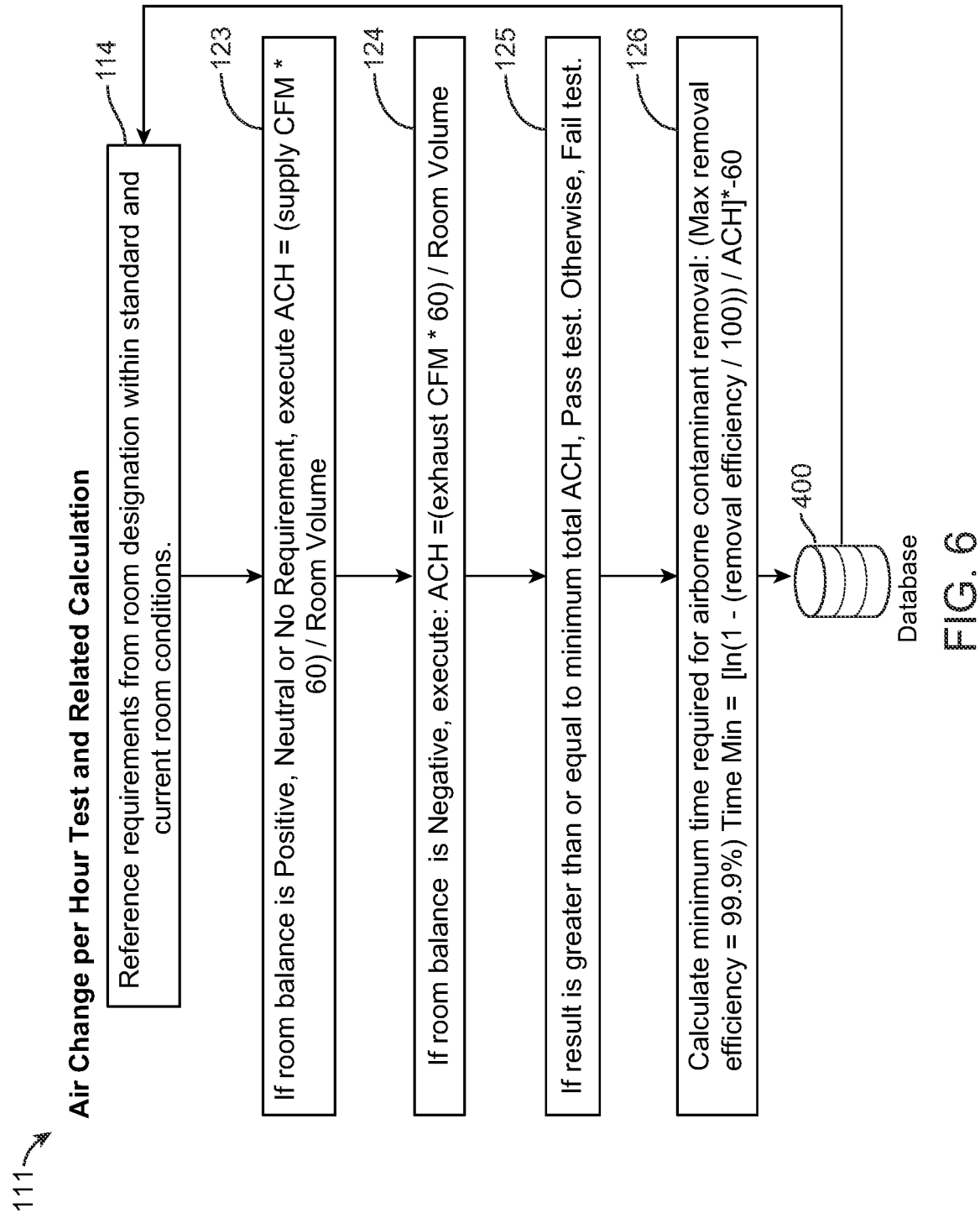
FIG. 6 illustrates air change per hour test equations within an embodiment of the Data Integration Module.

FIG. 6 of the accompanying drawings illustrates air change per hour test equations within an embodiment of the Data Integration Module 100. The calculation requires the referencing of minimum air change per hour, minimum differential percentage and balance requirements within the regulatory standard 103 based on the applied room designation 114 within a database(s) 400. With the referenced regulatory variables 301 and the measurements collected either manually, from the installed sensors in 202 or transmission from BAS, the following "if" statements and calculations are processed to determine if the individual rooms pass the air change requirements associated with the selected room designation.

If the pressure balance requirement of the room is Positive, Neutral or No Requirement, convert register Supply CFM to CFH and divide it by room's volume 123. If the pressure balance requirement of the room is Negative, convert register Return/Exhaust CFM to CFH and divide it by room's volume 124. If the result is greater than or equal to the minimum total air change per hour, pass the test. Otherwise, fail test 125.

With the now calculated ACH values, calculate minimum time required for airborne contaminant removal 126. To perform this calculation, divide the desired removal efficiency of the room with a maximum value of 99.9 by 100. Then subtract this value by 1, take the natural log of the result and then divide by the room's ACH. Lastly to get the minutes required for airborne contaminant removal, multiply the result by −60 to convert from hours to minutes and make the value positive. The test results, are transmitted to a structured database, or varied databases 400, for storage and referencing for air balance report generation.

Figure 7:
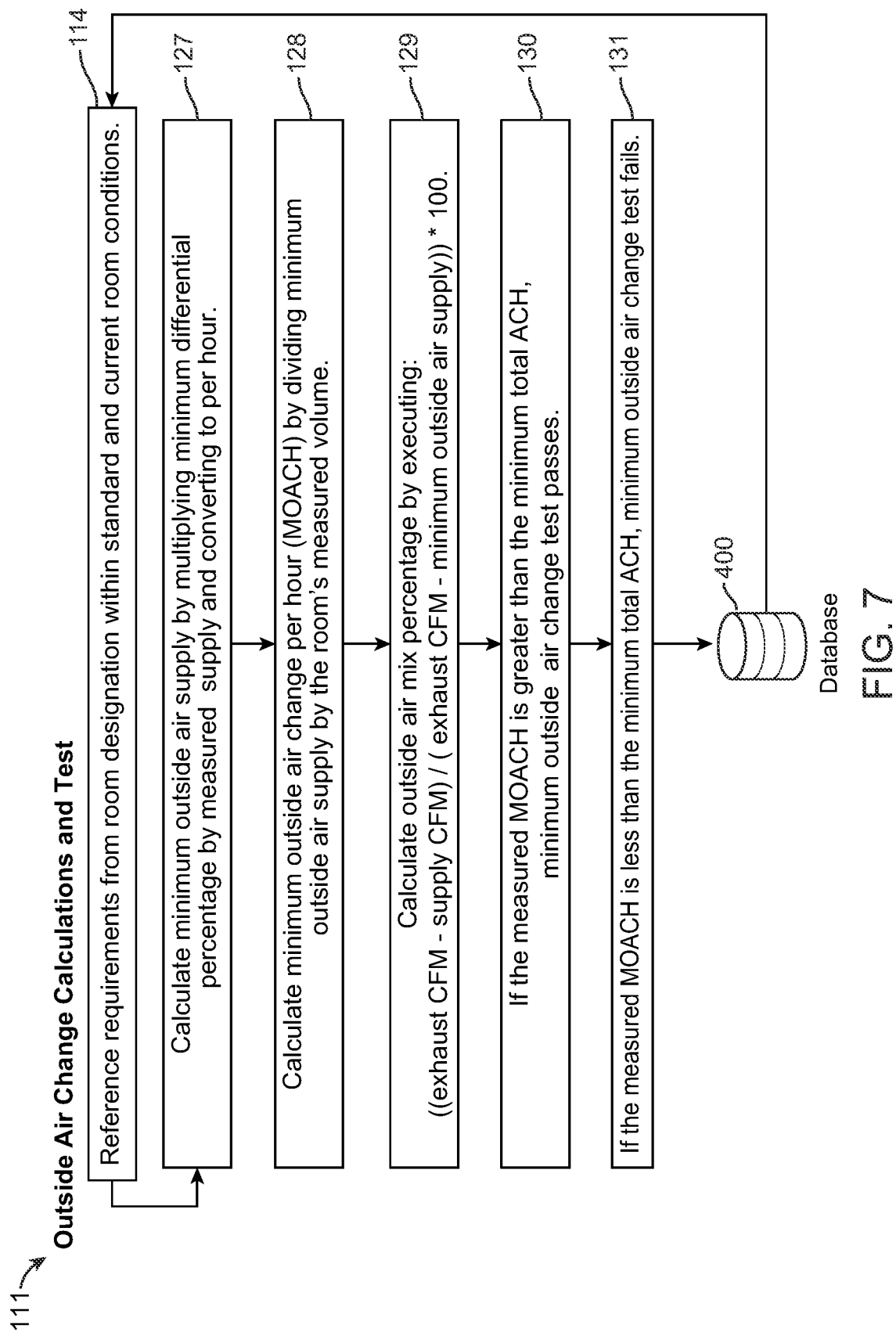
FIG. 7 illustrates outside air change test equations within an embodiment of the Data Integration Module.

FIG. 7 of the accompanying drawings illustrates outside air change test equations within an embodiment of the Data Integration Module 100. The calculation requires the referencing of minimum air change per hour, minimum differential percentage and balance requirements within the regulatory standard 103 based on the applied room designation 114 within a database(s) 400. With the referenced regulatory variables 114 and the measurements collected either manually, from the installed sensors in 202 or transmission from BAS, the following "if" statements and calculations are processed to determine if the individual rooms pass the air change requirements associated with the selected room designation.

To prepare for the outside air change test, first calculate minimum outside air supply by multiplying minimum differential percentage by measured supply and converting to per hour 127. Then calculate minimum outside air change per hour ("MOACH") by dividing minimum outside air supply by the room's measured volume 128. With the calculated variables, calculate outside air mix percentage 129 by subtracting exhaust CFM by supply CFM divide the subtraction of exhaust CFM by minimum outside air supply. Multiply that result by 100 to generate the outside air mix percentage. The outside air change test is performed by completing the following "if" statements. If the measured MOACH is greater than the minimum total ACH, minimum outside air change test passes 130. If the measured MOACH is less than the minimum total ACH, minimum outside air change test fails 131. The test results, are transmitted to a structured database, or varied databases 400, for storage and referencing for air balance report generation.

Figure 8:
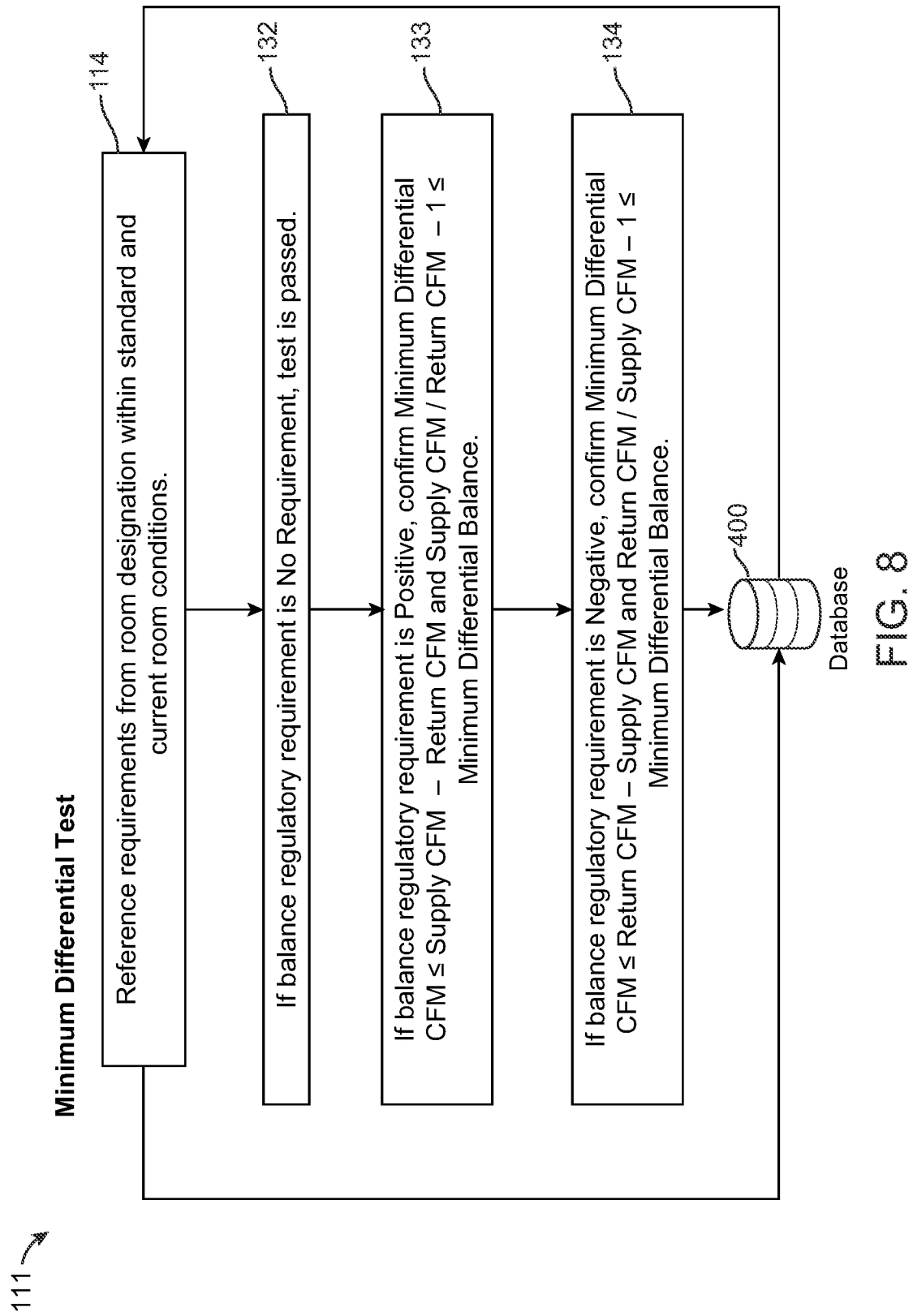
FIG. 8 illustrates minimum differential test equations within an embodiment of the Data Integration Module.

FIG. 8 of the accompanying drawings illustrates minimum differential test equations within an embodiment of the Data Integration Module 100. The calculation requires the referencing of pressure balance requirements, minimum differential CFM and minimum differential pressure within the state regulatory standard 103 based on the applied room designation 114 within a database(s) 400. With the referenced regulatory variables and the measurements collected from the installed sensors 202, the following "if" statements are processed to determine if the individual rooms pass the pressure differential requirements associated with the selected room designation.

If the pressure balance regulatory requirement is No Requirement, the test is passed 132. If the pressure balance regulatory requirement is Positive, confirm the Supply CFM, subtracted from the Return CFM, is greater than or equal to the Minimum Differential CFM and the Supply CFM divided by the Return CFM subtracted from one is less than or equal to the Minimum Differential Balance for the respective room designations 133. If the pressure balance regulatory requirement is Negative, confirm the Return CFM, subtracted from the Supply CFM, is greater than or equal to the Minimum Differential CFM and the Return CFM divided by the Supply CFM subtracted from one is less than or equal to the Minimum Differential Balance for the respective room designations 134. The test results, are transmitted to a structured database, or varied databases 400, for storage and referencing for air balance report generation.

Figure 9:
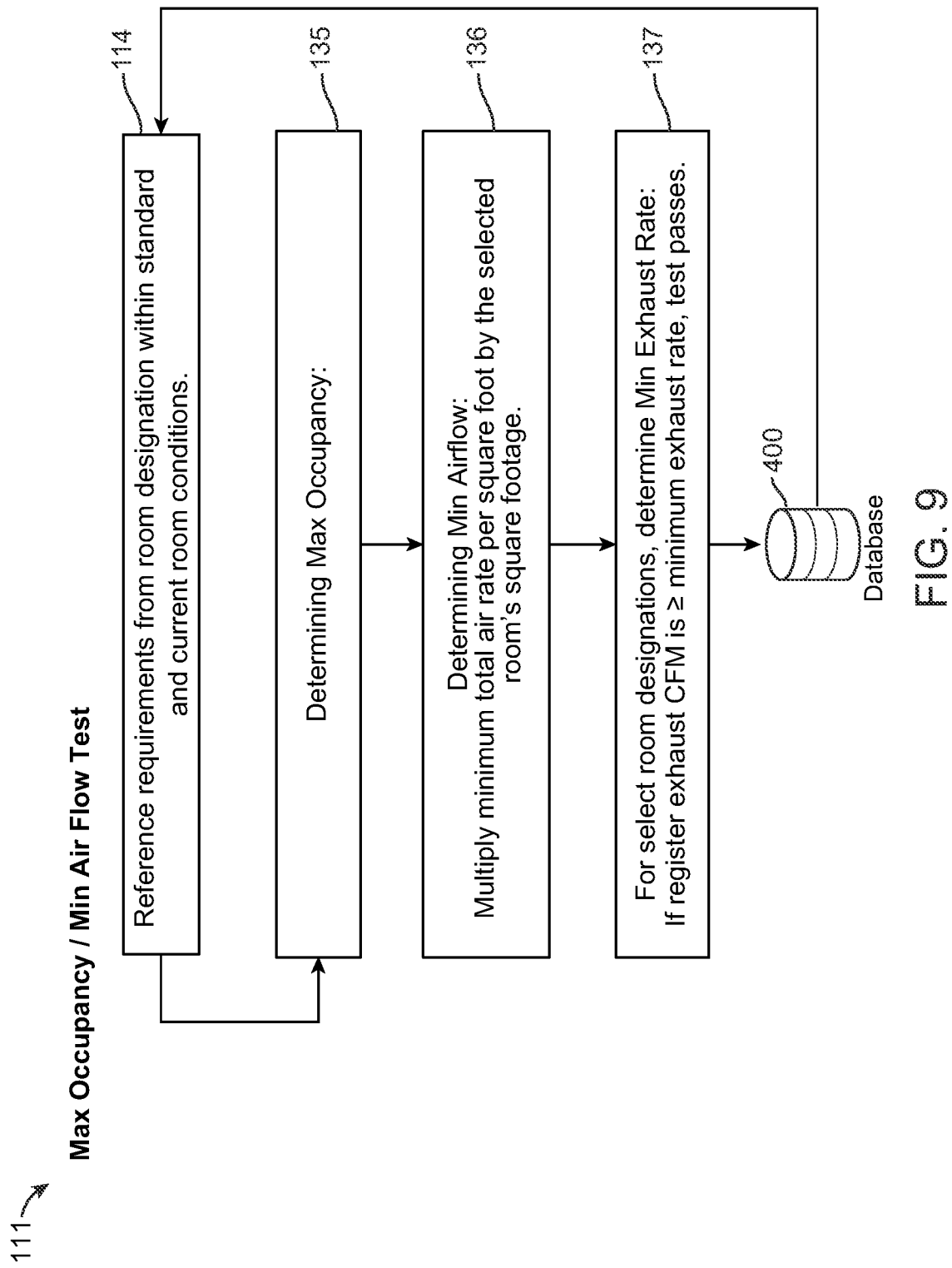
FIG. 9 illustrates maximum occupancy and minimum airflow test equations within an embodiment of the Data Integration Module.

FIG. 9 of the accompanying drawings illustrates maximum occupancy and minimum airflow test equations within an embodiment of the Data Integration Module 100. The calculation requires the referencing of minimum total air rate per occupant, minimum total air rate per square foot and exhaust air rate from the room designation within regulatory standard 114 within a database(s) 400. With the referenced regulatory variables and the measurements collected from the installed sensors 202, the maximum occupancy value for the individual rooms is generated from the following equation.

Divide measured register Supply CFM by minimum total air rate per occupant. The value is displayed within the software application once calculated 135. With the referenced regulatory variables and the measurements collected from the installed sensors, the following "if" statements are processed to determine if the individual rooms pass the minimum airflow and minimum exhaust rate requirements associated with the selected room designation.

Multiply minimum total air rate per square foot by the selected room's square footage. If the value is less than or equal to the register Supply CFM, the minimum airflow test passes 136.

If register Exhaust CFM is greater than or equal to the minimum exhaust rate, the exhaust rate test passes 137. The exhaust rate is only required for select room designations. The test results, are transmitted to a structured database, or varied databases 400, for storage and referencing for air balance report generation.

Figure 10:
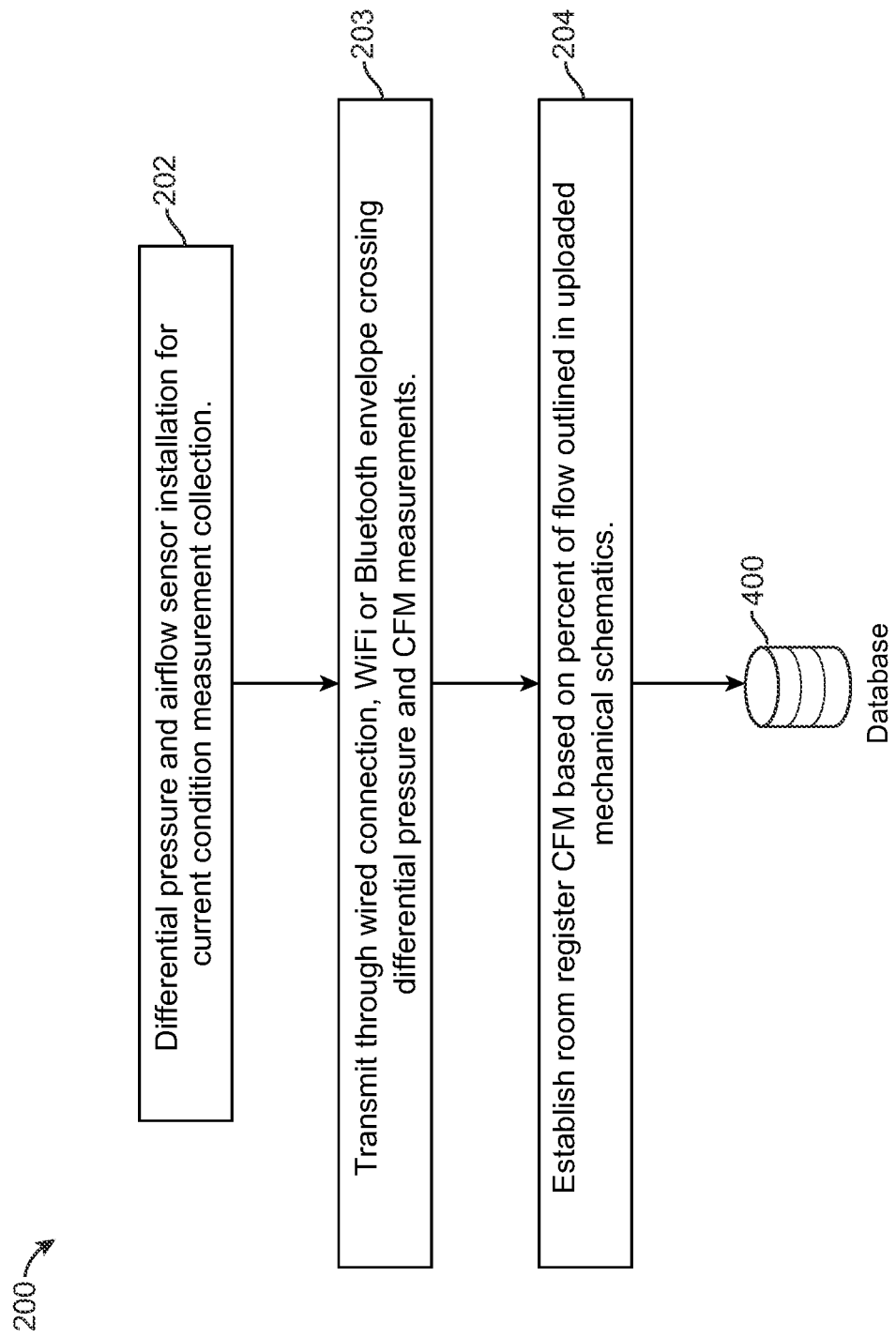
FIG. 10 illustrates an embodiment of the Condition Monitoring Module.

FIG. 10 of the accompanying drawings illustrates an embodiment of the Condition Monitoring Module ("CMM") 200. Differential pressure sensors 205 involved in the illustrated method can include but are not limited to the following. A differential pressure sensor 205 and transmitter where by the application is to measure differential pressure established at the supply and exhaust constant air volume and variable air volume terminal units 207. Once installed 202, the data collected from the sensors transmit through WiFi or Bluetooth populating the envelope crossing and register differential pressure measurements 203. In an embodiment, BAS set points may be calculated based on these measurements or retrieved separately. The CFM measurements of the room registers connected to the terminal units are calculated based on the percentage of CFM applied to said rooms in the imported mechanical schematics 105. A differential low-pressure sensor where by the application is to measure differential pressure established on either side of envelope crossing connecting to critical care rooms and rooms with positive or negative balance requirements. Once the differential pressure measurements are collected from the sensors, they are converted to the CFM of the terminal units. This CFM measurement is split into register CFM measurement based on the designed flow percentage 204. These split measurements 204 are automatically applied to each register within the invention, With the current condition measurements, infection control parameter-tests can be performed utilizing the building specifications and regulatory standards 103, collected in the DIM 100, stored in a structured database(s) 400.

Figure 11:
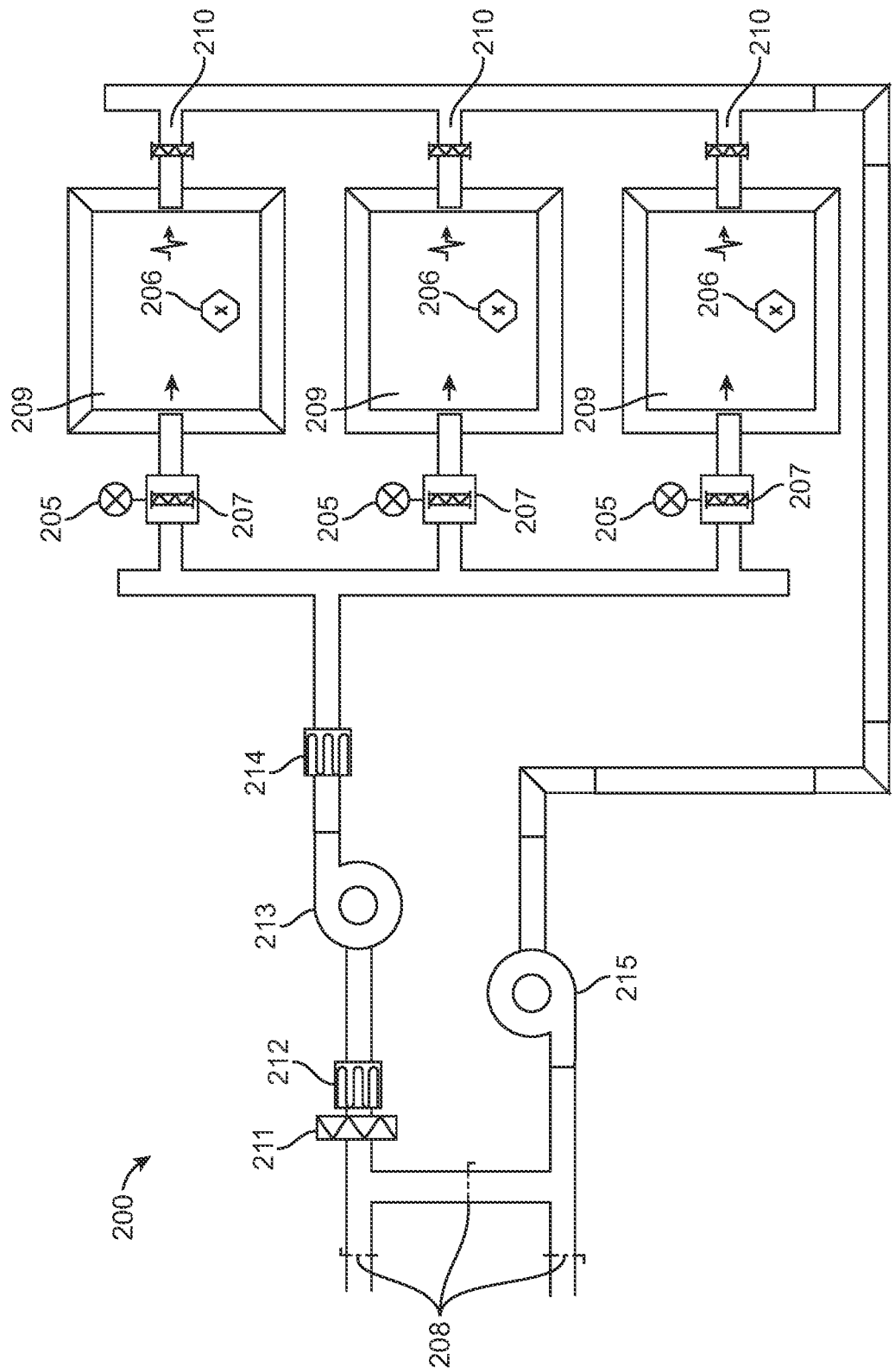
FIG. 11 illustrates the existing duct system structure and the installed sensors with an embodiment of the Condition Monitoring Module.

FIG. 11 of the accompanying drawings illustrates the existing duct system structure and the installed sensors with an embodiment of the Condition Monitoring Module 200. Variable air volume ("VAV") systems have a central air handler unit ("AHU") that delivers primary air at a defined temperature to terminal boxes 207 in each zone 209. This defined temperature is set and measured on the thermostat sensors 206 in each zone. Since the defined temperature can be different for zones 209 supplied by the same AHU, pre-heating 212 and cooling coils 214 are installed with the supply air fan 213 to bring the average air temperature sent to the fan 213 to the correct temperature for the zones it is connected to. The terminal boxes or VAV boxes 207 have a primary-air damper 208 controlled automatically. This damper 208 regulates the volume of primary air delivered to the box 207 according to the demand. Since each box 207 regulates the airflow independently, the total volume supplied by the AHU varies according to the demand of all the boxes 207. Thus, the variable airflow is achieved by controlling the speed of the supply air fan 213. To achieve this airflow, typically, there is a directional pressure sensor 206 at the inlet of a VAV terminal unit 207. This sensor 206, combined with the static pressure gage 205, measures airflow by measuring the differential pressure on either side of the sensor. This measurement is sent as a wired signal to the VAV controller, which calculates the airflow rate based on these values. The VAV controller compares this measured airflow rate to an airflow set point. This set point is determined based on the heating or cooling and/or ventilation demands. If a significant difference exists, the VAV controller commands the actuator to either open or close the VAV damper 208 position and thus change the airflow rate. For the invention, this airflow rate measurement may be gathered from the VAV controller through integrating with the BAS. To gather the same measurement from the exhaust side of the system an airflow sensor and transmitter is installed at the outlet 210 of each zone 209. For constant air volume systems, the same type of directional pressure sensor 206, static pressure sensor 205 and transmitter, which are installed at the exhaust outlets 210 of the VAV zones 209, are installed on the supply and exhaust sides of the system, similar to how the VAV sensor system is structured. If integrating with the BAS is not feasible, directional pressure sensor 206, static pressure sensor 205 and transmitter will need to be installed on the supply side of the VAV system as well.

Figure 12:
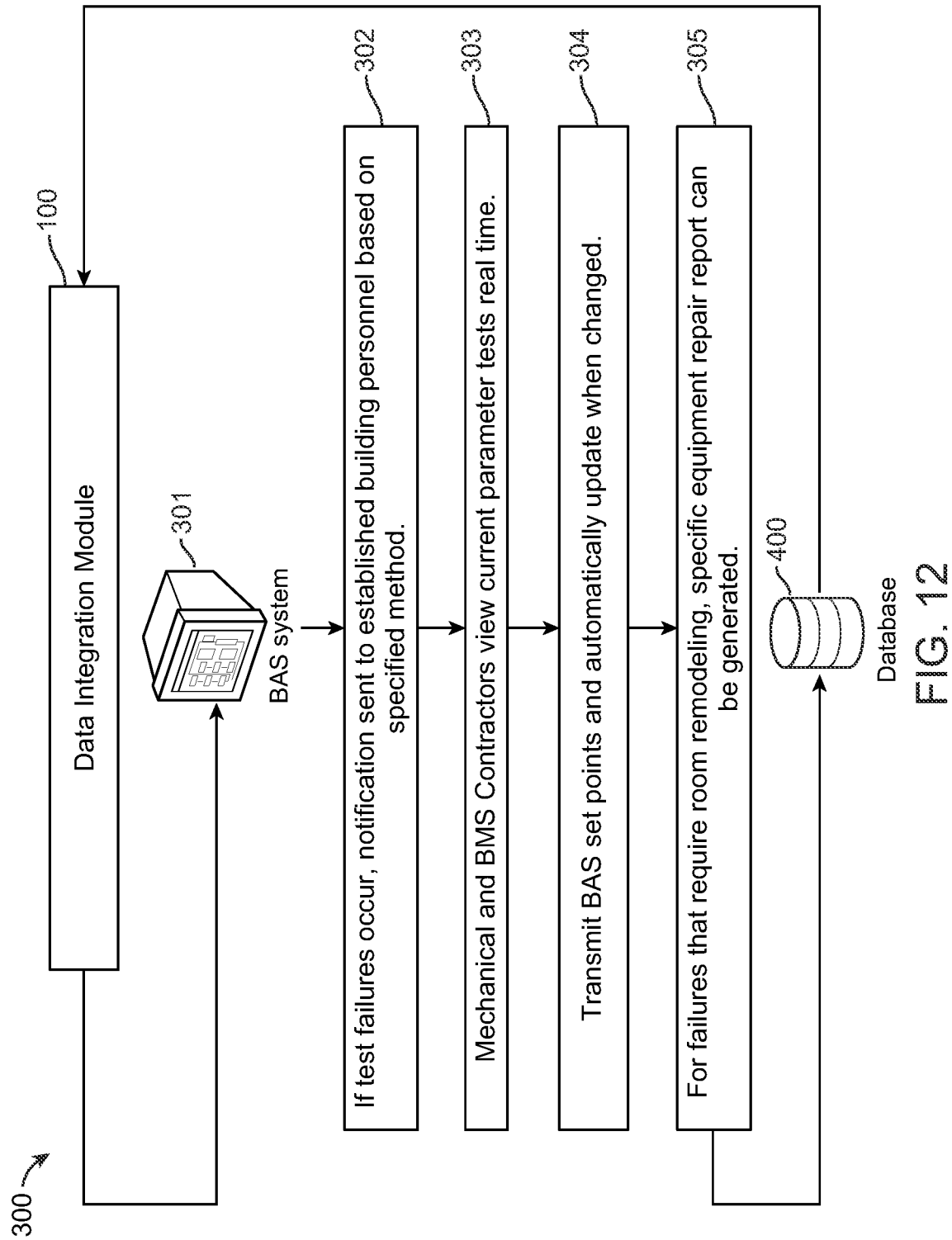
FIG. 12 illustrates an embodiment of the Integrated Monitoring Module.

FIG. 12 of the accompanying drawings illustrates an embodiment of the Integrated Monitoring Module ("IMM") 300. The IMM 300 integrates calculations that consider the current conditions listed prior, equipment specifications, equipment performance and the selected regulatory standard from the second aspect of the Data Integration Module 100. If a room fails its specific air balance, air change or differential pressure requirement, a suggestion of how to remedy this condition, along with failed room information is displayed within the BAS 301 and air balance and infection control failure notifications 302 are then sent to the building's engineers or other designated personnel.

General information contained in the notifications 302 may consist of the location, time and type of failure that occurred within the building. In an embodiment of the IMM, the notification 302 contains information concerning how to remedy the failing condition. An example of this is the display of excess supply or exhaust CFM and excess air change per hour within a room connected to the same terminal unit. The information in the notification 302 will allow the troubleshooting and adjustment process to occur much more efficiently. Following the digital notification 302, the BAS 301 adjusts the VAV terminal units to optimize the airflow needed to meet the required standards. Additionally, Mechanical and BMS Contractors can view current parameter tests real time 303 for adjusting and calibrating fans, terminal units, set points and dampers. The Integrated Monitoring Module 300 allows Mechanical and BMS Contractors tracking and generating instantaneous reports of monitored conditions capabilities for the BAS 301. This integration also allows the BAS set points to be automatically updated 304 within a database(s) 400, enabling more efficient responses to changing conditions within the building. For failures that require room remodeling, specific equipment repair reports 305 can be generated through the connection with a database, or varied databases 400, and the DIM 100. The IMM 300 overall enables a more efficient process to respond to changing conditions within the building creating a safer working environment for every occupant.

Figure 13:
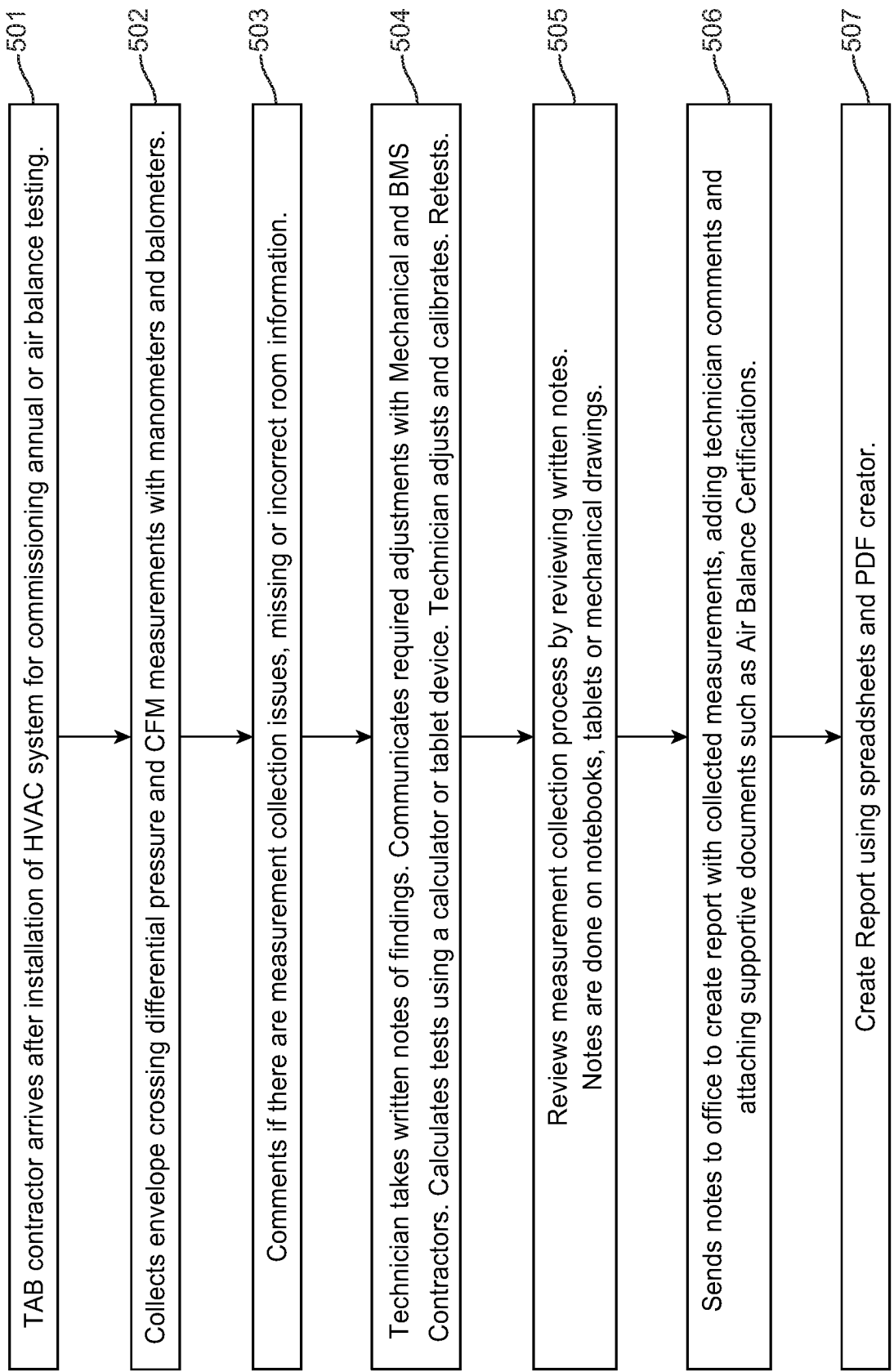
FIG. 13 illustrates an air balance testing process method.

FIG. 13 of the accompanying drawings illustrates the prior art air balance testing process method. The air balance contractor arrives after installation of the ventilation system or for periodic air balance testing 501. The contractor collects envelope crossing differential pressure measurements and register CFM measurements with manometers and barometers along with BAS set points from each "Critical Care" room 502. Comments are made if there are measurement collection issues, missing or incorrect room information on either a personal note pad or printed out mechanical drawings 503. The technician takes written notes of findings and communicates required adjustments with mechanical and BMS contractors. The technician calculates tests using a calculator or tablet device. Technician adjusts and calibrates 504. Processes 502, 503 and 504 are performed repeatedly for each room throughout the building during this current method. The technician reviews the measurement collection process by reviewing written notes 505. Notes are done on notebooks, tablets or mechanical drawings. Notes are sent to the office to create reports with collected measurements, adding technician comments and attaching supportive documents such as Air Balance Certifications 506. Reports are created using spreadsheets and PDF editors 507.

Figure 14:
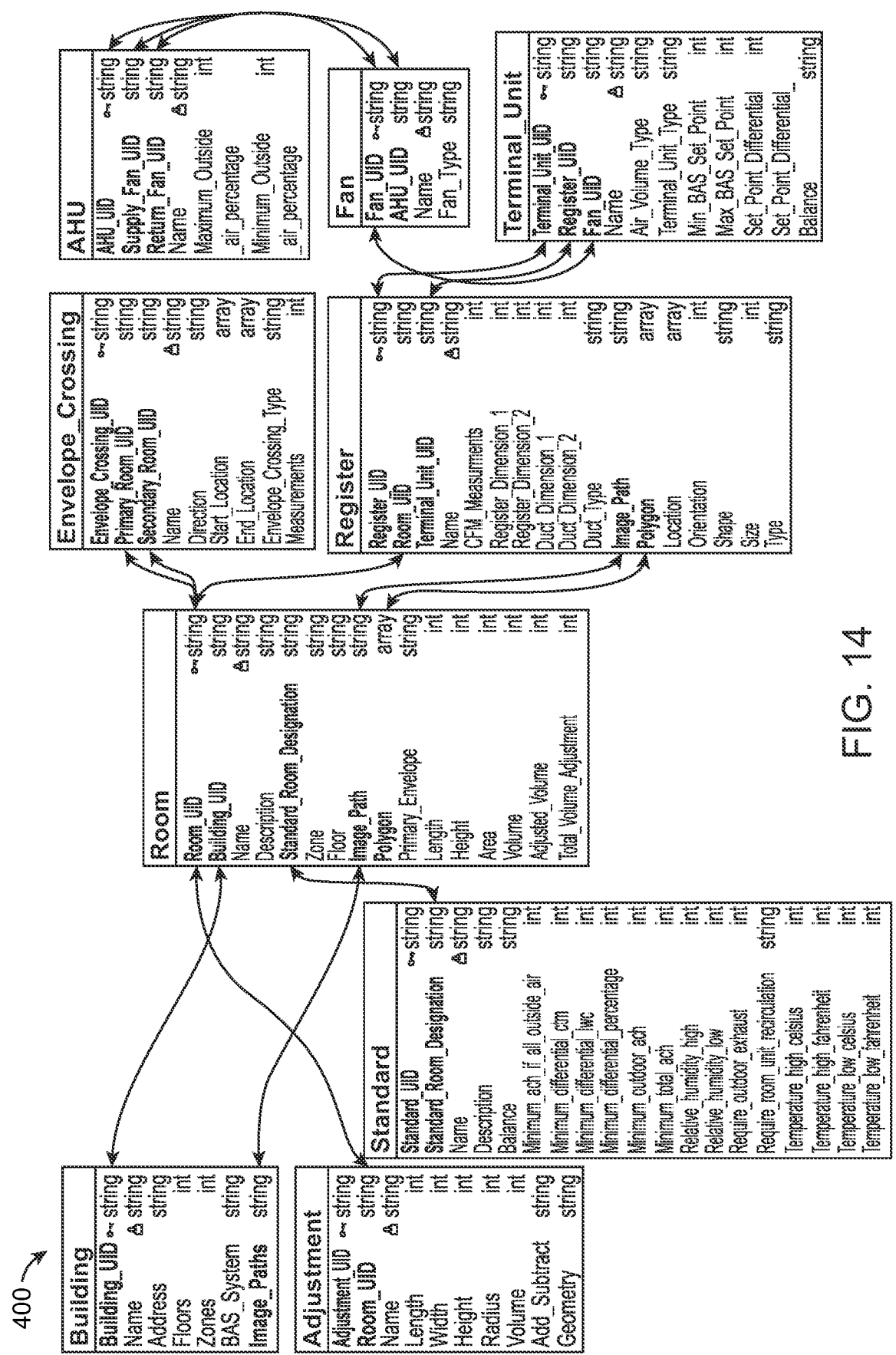
FIG. 14 illustrates table and data interactions within an embodiment of a Structured Database.

FIG. 14 of the accompanying drawings illustrates table and data interactions within an embodiment of a Structured Database. A table is a collection of related data held in a table format within a database. It consists of columns and rows. The embodiment of a database may be a relational database. In this embodiment, a table is a set of data elements using a model of vertical columns identifiable by name and horizontal rows, the cells of the table being where a row and column intersect. A table has a specified number of columns, but can have any number of rows. Each row is identified by one or more values appearing in a particular column subset. A specific choice of column, which uniquely identify rows, is called a primary key. When the primary key of a table is contained within a related table, it is called a foreign key within the related table.

An advantage of the invention is the DIM 100. The DIM 100 is that it integrates each of the components in the building design, the air balance regulatory standard requirements and the current air balance conditions for the entire facility, not just critical rooms, which generally represents only a small portion of the facility. The DIM allows parameter testing based on the original building design standards, as well as on newer standards. It generates automated reports based on comprehensive data sets including room relationships within a building, the HVAC equipment, room designation and parameter test results. The DIM identifies the cause of infection control deficiencies more accurately, efficiently, and it provides support data to remedy the deficiencies.

Another advantage of the invention is the CMM 200. The CMM 200 automates the process of collecting current conditions data by using sensors instead of handheld tools and manual inputs, reducing the disruption to medical operations that testing and balancing normally causes. Using the CMM 200, the DIM 100 can retrieve data more frequently. It replaces static data with dynamic data streams, which allows the DIM to update its calculations continuously. Using the CMM 200, the DIM 100 can identify any deficiencies and remedy any problems more efficiently.

Another advantage of the invention is the IMM 300. The IMM 300 tracks air balance and infection control conditions simultaneously with the operation of the building automation systems. The IMM 300 allows for more efficient installation of the invention by utilizing sensors already installed by the BAS. It reveals actual room conditions and helps prevent airborne infections by adjusting the BAS settings, without disrupting the occupants of the facility. The IMM 300 will generate warnings or alarms when conditions in a room or a corridor exist that make the occupant vulnerable to an airborne infection risk.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for controlling airborne infection in an at least one environment containing a plurality of rooms, the system comprising:
    a data integration module receiving a first data, the first data including at least one of building specifications, HVAC equipment specifications, design conditions and at least one regulatory standard, wherein the building specifications are comprised of at least one of life safety and mechanical drawings, the data integration module further comprising a virtual representation of the at least one environment based on the first data;
    a sensor system, wherein the sensor system includes at least one differential pressure sensor located in the at least one environment;
    a condition monitoring module connected to the sensor system, the condition monitoring module receiving a second data at pre-determined intervals from the sensor system, the second data including at least current conditions of the at least one environment and transmitting it to the data integration module;
    wherein the data integration module receives the second data and calculates a parameter test for the at least one environment;
    wherein the data integration module generates a report, wherein the report includes a full list of values of at least one of air flow rate and differential pressure measurements of the at least one environment for every register located within the plurality of rooms within the at least one environment; and
    an HVAC component and wherein the data integration module is configured to adjust a parameter of said HVAC component based upon a remedy for a deficiency, where the remedy is based upon at least one of the air flow rate, the differential pressure, air balance, air changes, and outside air changes of the at least one environment.

2. The system of claim 1 wherein the at least one environment includes at least one of at least one room and at least one corridor and at least one envelope crossing.

3. The system of claim 2 wherein the at least one room and corridor have a different regulatory standard.

4. The system of claim 2 wherein the data integration module optionally determines at least one failure in at least one of at least one room and at least one corridor from the first and second data and transmitting a notification based on the at least one failure.

5. The system of claim 2 wherein the data integration module assigns a naming convention to at least one room and corridor.

6. The system of claim 1, wherein the at least one environment includes the at least one room and corridor mapped to corresponding standards data for air balance.

7. The system of claim 1, wherein the virtual representation includes an HVAC location overlay.

8. The system of claim 1, wherein the HVAC equipment specifications include at least location of air handlers units, fans, variable frequency drives, duct systems, terminal units, and registers.

9. The system of claim 4, wherein the failure can be at least one of air balance, air change, and differential pressure requirement.

10. The system of claim 1 wherein the report includes displaying infection control parameter-tests based on at least one of original design or newer standard.

11. The system of claim 1 where in the report includes predictive modeling comprising theoretical airflow and differential pressure condition measurements.

12. The system of claim 1 wherein the condition monitoring module receiving a second data in real-time.

13. The system of claim 1, wherein at least one of the data integration module and conditioning monitoring module communicates with a database to store the first and second data, wherein the database is configured to communicate with an integrated monitoring module, and wherein the first and second data is accessible to pre-selected users via the integrated monitoring module.

14. A system for controlling airborne infection in an at least one environment, the system comprising:
a data integration module receiving a first data, the first data including at least one of building specifications, HVAC equipment specifications, design conditions and at least one regulatory standard, wherein the building specifications are comprised of at least one of life safety and mechanical drawings, the data integration module further comprising a virtual representation of the at least one environment based on the first data;
a sensor system, wherein the sensor system includes at least one differential pressure sensor located in the at least one environment;
a condition monitoring module connected to the sensor system, the condition monitoring module receiving a second data at pre-determined intervals from the sensor system, the second data including at least current conditions of the at least one environment and transmitting it to the data integration module;
wherein the data integration module receives the second data and calculates a parameter test;
wherein the data integration module generates a report and stores the report into the first data, wherein the report includes a schematic of the environment based upon building specifications stored within the first data and values of air flow rate and differential pressure measurements, and wherein the schematic further includes the values from the parameter test conducted by the data integration module; and
an HVAC component and wherein the data integration module is configured to adjust a parameter of said HVAC component based upon a remedy for a deficiency, where the remedy is based upon at least one of the air flow rate, the differential pressure, air balance, air changes, and outside air changes of the at least one environment.

15. The system of claim 14, wherein at least one of the data integration module and conditioning monitoring module communicates with a database to store the first and second data, wherein the database is configured to communicate with an integrated monitoring module, and wherein the first and second data is accessible to pre-selected users via the integrated monitoring module.

16. A system for controlling airborne infection in an at least one environment containing a plurality of rooms, the system comprising:
a data integration module receiving a first data, the first data including at least one of building specifications, HVAC equipment specifications, design conditions and at least one regulatory standard, wherein the building specifications are comprised of at least one of life safety and mechanical drawings, the data integration module further comprising a virtual representation of the at least one environment based on the first data;
a sensor system, wherein the sensor system includes at least one differential pressure sensor located in the at least one environment;
a condition monitoring module connected to the sensor system, the condition monitoring module receiving a second data at pre-determined intervals from the sensor system, the second data including at least current conditions of the at least one environment and transmitting it to the data integration module
wherein the data integration module receives the second data and calculates a parameter test for the at least one environment; and
wherein the data integration module generates a report, wherein the report includes a full list of values of at least one of air flow rate and differential pressure measurements of the at least one environment for every envelope crossing located within the plurality of rooms of the at least one environment; and
an HVAC component and wherein the data integration module is configured to adjust a parameter of said HVAC component based upon a remedy for a deficiency, where the remedy is based upon at least one of the air flow rate, the differential pressure, air balance, air changes, and outside air changes of the at least one environment.

17. The system of claim 16, wherein at least one of the data integration module and conditioning monitoring module with a database to store the first and second data, wherein the database is configured to communicate with an integrated monitoring module, and wherein the first and second data is accessible to pre-selected users via the integrated monitoring module.

* * * * *